(12) United States Patent
Maranas et al.

(10) Patent No.: US 10,608,281 B2
(45) Date of Patent: Mar. 31, 2020

(54) NANOFILLED SOLID POLYMER ELECTROLYTES

(71) Applicant: The Penn State Research Foundation, University Park, PA (US)

(72) Inventors: Janna Maranas, State College, PA (US); Pengfei Zhan, State College, PA (US); Lalitha VNR Ganapatibhotla, Pearland, TX (US)

(73) Assignee: The Penn State Research Foundation, University Park, PA (US)

( * ) Notice: Subject to any disclaimer, the term of this patent is extended or adjusted under 35 U.S.C. 154(b) by 272 days.

(21) Appl. No.: 15/441,980

(22) Filed: Feb. 24, 2017

(65) Prior Publication Data

US 2017/0250442 A1   Aug. 31, 2017

Related U.S. Application Data

(60) Provisional application No. 62/302,009, filed on Mar. 1, 2016, provisional application No. 62/300,543, filed on Feb. 26, 2016.

(51) Int. Cl.
*H01M 10/0565* (2010.01)
*H01M 10/0525* (2010.01)
*H01M 10/0562* (2010.01)

(52) U.S. Cl.
CPC ... *H01M 10/0565* (2013.01); *H01M 10/0525* (2013.01); *H01M 10/0562* (2013.01); *H01M 2300/0082* (2013.01); *H01M 2300/0091* (2013.01)

(58) Field of Classification Search
CPC ......... H01M 10/0565; H01M 10/0562; H01M 10/0525; H01M 2300/0091; H01M 2300/0082
USPC ........................................... 429/317
See application file for complete search history.

(56) References Cited

U.S. PATENT DOCUMENTS

| 8,475,688 B2 | 7/2013 | Chen et al. | |
| 2012/0082901 A1* | 4/2012 | Schmidt | H01M 4/133 429/308 |
| 2013/0022827 A1* | 1/2013 | Imai | B32B 27/12 428/446 |
| 2013/0171439 A1 | 7/2013 | Shoseyov et al. | |
| 2013/0273441 A1 | 10/2013 | Chen et al. | |
| 2014/0272599 A1* | 9/2014 | Morin | H01G 11/56 429/247 |
| 2015/0076742 A1* | 3/2015 | Joo | D01D 1/02 264/433 |

(Continued)

OTHER PUBLICATIONS

L. Ganapatibhotla et al., "Interplay of Surface Chemistry and Ion Content in Nanoparticle-Filled Solid Polymer Electrolytes", Macromolecules, vol. 47, Issue 11, (2014), pp. 3625-3634; and Supporting Information.

(Continued)

*Primary Examiner* — Gary D Harris
(74) *Attorney, Agent, or Firm* — Buchanan Ingersoll & Rooney PC

(57) ABSTRACT

Embodiments of the disclosure relate to solid electrolytes comprising nanowhiskers. More particularly, embodiments of the disclosure relate to solid electrolytes comprising $PEO_6LiX$ crystalline complex and nanowhiskers to stabilize the $PEO_6LiX$ crystalline complex.

23 Claims, 30 Drawing Sheets

Oxygen  Lithium  PEO backbone

(56) References Cited

U.S. PATENT DOCUMENTS

2015/0171395 A1* 6/2015 Ikuma ............... B01D 67/0027
429/249
2016/0344081 A1* 11/2016 Kwon .................. H01M 4/382

OTHER PUBLICATIONS

M. Bee, Quasielastic Neutron Scattering, "7.2 Uniaxial Rotation with Non-Uniform Distribution", Orientationally Disordered Phases, (1988), 1 page.
N. Do et al., "Influence of Fe2O3 Nanofiller Shape on the Conductivity and Thermal Properties of Solid Polymer Electrolytes: Nanorods versus Nanospheres", The Journal of Physical Chemistry, (2012), pp. 21216-21223.
C. Zhou et al., "Electrospun Polyethylene Oxide/Cellulose Nanocrystal Composite Nanofibrous Mats with Homogeneous and Heterogeneous Microstructures", Biomacromolecules, (2011), pp. 2617-2625.
Y. Samad et al., "Electrospun cellulose/PEO fiber mats as a solid polymer electrolytes for Li ion batteries", Elsevier, Renewable Energy, vol. 56 (2013), pp. 90-95.
International Search Report dated May 4, 2017 in PCT/US2017019441, 2 pages.

* cited by examiner

Ionic conductivities of unfilled, particle-filled and nanowhisker-filled electrolytes as a function of EO/Li ratio and temperature.

Isotropic vs anisotropic nanofillers: Conductivity increase with high aspect ratio fillers occurs via long range stabilization of multiple layers consisting of PEO6:LiClO4 tunnels.

Bar chart comparing the percentage increase in conductivity with nanowhiskers and particles in a range of EO/Li ratios and temperatures.

Effect of filler loading on SPE conductivity in the presence of nanowhiskers and particles.

QENS data for PEO+LiClO4 (EO/Li=10:1) sample obtained from DCS, BASIS, and HFBS instruments fit to Equation 2

Effect of fillers on PEO dynamics in the absence of salt.

Segmental dynamics in nanowhisker and particle filled electrolytes are compared to unfilled electrolyte for an 8:1 EO/Li composition at a range of temperatures.

Segmental dynamics in nanowhisker and particle filled electrolytes are compared to unfilled electrolyte for a 10:1 EO/Li composition at a range of temperatures.

Segmental dynamics in nanowhisker and particle filled electrolytes are compared to unfilled electrolyte for a 14:1 EO/Li composition at a range of temperatures.

Comparison of segmental dynamics with nanowhiskers and particles at loadings greater than the loading of optimal conductivity.

Influence of nanowhiskers on rotational relaxation times of $PEO_6:LiClO_4$ tunnels are compared to those in the particle-filled and unfilled electrolytes for 8:1 EO/Li compositions at a range of temperatures.

Influence of nanowhiskers on rotational relaxation times of $PEO_6:LiClO_4$ tunnels are compared to those in the particle-filled and unfilled electrolytes for 10:1 EO/Li compositions at a range of temperatures.

Influence of nanowhiskers on rotational relaxation times of $PEO_6:LiClO_4$ tunnels are compared to those in the particle-filled and unfilled electrolytes for 14:1 EO/Li compositions at a range of temperatures.

EISF$_2$ as a function of q at 8:1 EO/Li at a range of temperatures for unfilled, 5 wt% neutral particle filled and 1 wt% neutral nanowhisker-filled SPEs.

EISF$_2$ as a function of q at 10:1 EO/Li at a range of temperatures for unfilled, 5 wt% neutral particle filled and 1 wt% neutral nanowhisker-filled SPEs.

EISF$_2$ as a function of q at 14:1 EO/Li at a range of temperatures for unfilled, 5 wt% neutral particle filled and 1 wt% neutral nanowhisker-filled SPEs.

Bar chart showing the variation of the model parameters with temperature in nanowhisker-filled eutectic sample.

NANOFILLED SOLID POLYMER ELECTROLYTES

CROSS REFERENCE TO RELATED APPLICATIONS

This application claims priority to U.S. Provisional Application No. 62/300,543 filed Feb. 26, 2016 and U.S. Provisional Application No. 62/302,009 filed Mar. 1, 2016. Both applications are incorporated by reference herein.

STATEMENT OF GOVERNMENT SPONSORSHIP

This invention was made with government support under Grant No. DMR1310196, awarded by the National Science Foundation. The Government has certain rights in the invention.

BACKGROUND

Field of the Disclosure

Embodiments of the disclosure relate to solid electrolytes.

Description of Related Art

Solid electrolytes are sometimes used in Lithium-Ion batteries. Development of Amorphous PEO+LiX as a solid electrolyte shows poor properties. PEO is polyethylene oxide. LiX refers to a lithium salt, where Li is the symbol for lithium used in the periodic table of elements. Further, while crystalline $PEO_6$+LiX has been shown to have higher conductivity than its amorphous equivalent, it is unstable with a low melting point, and increasing the molecular weight of PEO chain reduce conductivity and crystallinity.

BRIEF SUMMARY OF THE DISCLOSURE

Embodiments of the disclosure relate to solid electrolytes comprising nanowhiskers. More particularly, embodiments of the disclosure relate to solid electrolytes comprising at least one $PEO_6LiX$ crystalline complex and nanowhiskers to stabilize the at least one $PEO_6LiX$ crystalline complex.

Embodiments of the disclosure provide a crystalline solid electrolyte including a crystalline complex comprising $PEO_6$ and a lithium salt, and at least one nanofiller selected from the group consisting of natural cellulose nanowhiskers, treated cellulose nanowhiskers, and $Al_2O_3$ nanowhiskers.

Embodiments of the disclosure provide a crystalline solid electrolyte including a crystalline complex comprising $PEO_6$ and a lithium salt, and at least one nanofiller selected from the group consisting of natural cellulose nanowhiskers, acid treated cellulose nanowhiskers, and surface oxidized cellulose nanowhiskers.

Embodiments of the disclosure provide a crystalline solid electrolyte including a crystalline complex comprising $PEO_6$ and a lithium salt, and at least one nanofiller selected from the group consisting of natural cellulose nanowhiskers, acid treated cellulose nanowhiskers, surface oxidized cellulose nanowhiskers, $Al_2O_3$ nanowhiskers, and other metal oxide nanowhiskers, and the at least one nanofiller having an aspect ratio of at least about 10.

In an embodiment, the crystalline solid electrolyte comprises at least about 0.5 wt. % of nanofiller. In further embodiments, the crystalline solid electrolyte comprises between 0.5% and 5% of nanofiller.

In an embodiment, the crystalline solid electrolyte comprises from 0.1 wt % to 10 wt % of nanofiller.

In an embodiment, the crystalline solid electrolyte comprises about 1 wt. % of nanofiller.

In an embodiment, the crystalline solid electrolyte comprises from 0.1 to 4.0 wt. % of nanofiller.

In an embodiment, the crystalline solid electrolyte comprises from about 0.5 to about 2.5 wt. % of nanofiller.

In further embodiments, a lithium-ion battery comprises a crystalline solid electrolyte including a crystalline complex comprising $PEO_6$ and a lithium salt, and at least one nanofiller selected from the group consisting of cellulose nanowhiskers, treated cellulose nanowhiskers, metal oxide nanowhiskers, and $Al_2O_3$ nanowhiskers.

In further embodiments, the nanofiller includes cellulose nanowhiskers.

In further embodiments, the nanofiller includes cellulose nanowhiskers selected from the group consisting of acetobacter nanowhiskers and cotton nanowhiskers.

In further embodiments, the cellulose nanowhiskers have an aspect ratio of at least about 10.

In an embodiment, the cellulose nanowhiskers have an aspect ratio from about 10 to about 200.

In further embodiments the crystalline solid electrolyte comprises at least about 0.5 wt. % of cellulose nanowhiskers.

In an embodiment, the crystalline solid electrolyte comprises about 1 wt. % of cellulose nanowhiskers.

In an embodiment, the crystalline solid electrolyte comprises from 0.1 to 4.0 wt. % of cellulose nanowhiskers.

In an embodiment, the crystalline solid electrolyte comprises from about 0.5 to about 2.5 wt. % of cellulose nanowhiskers.

In further embodiments, the cellulose nanowhiskers have a crystalline structure.

In further embodiments, an average molecular weight of PEO is at least about 3200 g/mol.

In further embodiments, an average molecular weight of PEO is at least 100K Da.

In further embodiments, an average molecular weight of PEO is about 600K Da.

In further embodiments the crystalline complex comprising PEO and a lithium salt is selected from the group consisting of $LiClO_4$, $LiAsF_6$, LiTFSI, and other salts forms $PEO_6$ complex with PEO.

In further embodiments, the cellulose nanowhiskers are treated with an acid selected from the group consisting of $OSO_3H$ and $OPO_3H_2$, or oxidized to obtain —COOH surface group.

In further embodiments, the cellulose nanowhiskers have diameters of about 6 nm to about 15 nm.

In an embodiment, the cellulose nanowhiskers have diameters of about 6 nm to about 12 nm.

In an embodiment, the cellulose nanowhiskers have diameters of about 10 nm to about 15 nm.

In further embodiments, the cellulose nanowhiskers have lengths of about 150 nm to about 3 μm.

In an embodiment, the cellulose nanowhiskers have lengths of about 150 nm to about 200 nm.

In an embodiment, the cellulose nanowhiskers have lengths of about 1 μm to about 3 μm.

In further embodiments, the nanofiller includes $Al_2O_3$ nanowhiskers with diameters of about 2 nm to about 4 nm and lengths of about 200 nm to about 400 nm.

In further embodiments, the nanofiller has a conductivity at 20° C. of at least $10^{-5}$ S/cm and an activation energy for Li conduction less than 10 kJ/mol.

In further embodiments, the PEO and salt mixture has a eutectic composition.

In a range of ether oxygen to Li ratio from 3:1 to infinity to 1, a PEO and salt mixture forms a $PEO_6$ crystalline complex.

Unless otherwise specified, "a" and "an" as used in this disclosure, including the claims, mean "one or more."

BRIEF SUMMARY OF THE FIGURES

FIG. 9A shows segmental dynamics in nanowhisker and particle filled electrolytes compared to unfilled electrolyte for an 8:1 EO/Li composition at a range of temperatures.

FIG. 9B shows segmental dynamics in nanowhisker and particle filled electrolytes compared to unfilled electrolyte for an 10:1 EO/Li composition at a range of temperatures.

FIG. 9C shows segmental dynamics in nanowhisker and particle filled electrolytes compared to unfilled electrolyte for an 14:1 EO/Li composition at a range of temperatures.

FIG. 11A shows the influence of nanowhiskers on rotational relaxation times of $PEO_6:LiClO_4$ tunnels compared to those in the particle-filled and unfilled electrolytes for an 8:1 EO/Li at a range of temperatures.

FIG. 11B shows the influence of nanowhiskers on rotational relaxation times of $PEO_6:LiClO_4$ tunnels compared to those in the particle-filled and unfilled electrolytes for a 10:1 EO/Li at a range of temperatures.

FIG. 11C shows the influence of nanowhiskers on rotational relaxation times of $PEO_6:LiClO_4$ tunnels compared to those in the particle-filled and unfilled electrolytes for a 14:1 EO/Li at a range of temperatures.

FIG. 12A shows $EISF_2$ as a function of q at 8:1 EO/Li at a range of temperatures for unfilled, 5 wt % neutral particle filled and 1 wt % neutral nanowhisker-filled SPEs.

FIG. 12B shows $EISF_2$ as a function of q at 10:1 EO/Li at a range of temperatures for unfilled, 5 wt % neutral particle filled and 1 wt % neutral nanowhisker-filled SPEs.

FIG. 12C shows $EISF_2$ as a function of q at 14:1 EO/Li at a range of temperatures for unfilled, 5 wt % neutral particle filled and 1 wt % neutral nanowhisker-filled SPEs.

DETAILED DESCRIPTION OF THE DISCLOSURE

Figure 1A:
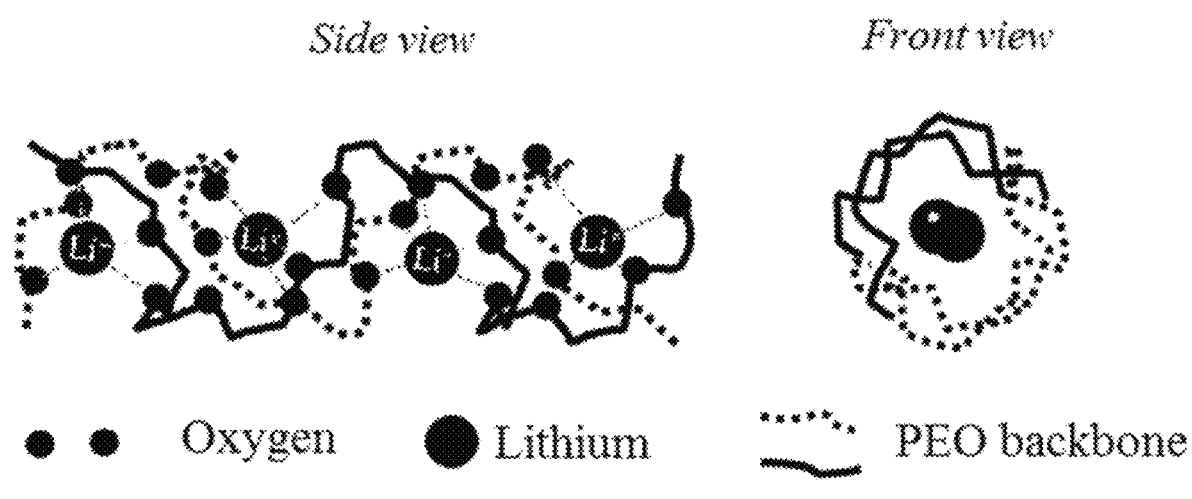
FIG. 1A shows a structure of $PEO_6LiX$ channel, with anions not shown.

Polymer electrolytes are safer, cleaner, and more flexible than liquid electrolytes currently being used in Li batteries. However, polyethylene oxide (PEO) based electrolytes are not stiff enough to prevent dendrite formation, which limits the use of a Li metal anode. They also do not have high enough conductivity to be practical. In amorphous polymer electrolytes, stiffness and conductivity are inversely related because Li motion is coupled to polymer motion. In previous technology, to increase the conductivity, liquid plasticizers were added to solid polymer electrolyte. Such attempt results in decreased stiffness and increased risks from flammable liquid plasticizers.

An electrolyte according to the invention comprises crystalline $PEO_6LiX$ complex as the conduction media. Crystalline $PEO_6LiX$ complex has high room temperature conductivity with minimal temperature dependence compared with solid polymer electrolytes currently available. The concept of conduction through $PEO_6LiX$ complex is not new. It has been demonstrated that single $PEO_6LiX$ crystal can be formed with oligomeric PEO, but this system is limited for application as oligomeric PEO melts at room temperature. With longer PEO chain, entanglement prevents the formation of ordered $PEO_6LiX$ crystalline domains. It has never been demonstrated $PEO_6LiX$ conduction mechanism can be used to promote conductivity in long molecular weight PEO-based electrolytes prior to this invention. Cellulose nanowhiskers promote the formation of $PEO_6LiX$ complex through the surface interaction. Addition of cellulose improves the conductive properties and increases the mechanical strength of the electrolyte.

Embodiments of the invention provide a solid electrolyte for a lithium-ion battery. The solid electrolyte comprises a crystalline complex of $PEO_6+LiX$. The crystalline complex comprises $PEO_6$ and may comprise a lithium salt selected from $LiClO_4$, $LiAsF_6$, LiTFSI, and other salts forms $PEO_6$ complex with PEO. To stabilize the complex, the solid electrolyte includes a nanofiller. The nanofiller may include at least one of natural cellulose nanowhiskers, treated cellulose nanowhiskers, metal oxide nanowhiskers, and $Al_2O_3$ nanowhiskers.

The nanowhiskers have a high aspect ratio to stabilize the $PEO_6+LiX$ along and between the nanowhiskers. The aspect ratio may be at least about 10. In an embodiment, the aspect ratio is at least about 100. In some embodiments, the aspect ratio is from about 10 to about 200. The nanowhiskers may have a diameter of about 2 nm to about 15 nm. The nanowhiskers may have a length from about 150 nm to about 3 µm. The solid electrolyte may comprise at least 0.5 wt. % of nanowhiskers. In an embodiment, the solid electrolyte comprises from about 0.5 to about 2.5 wt. % of nanowhiskers. In an embodiment, the solid electrolyte comprises about 1 wt. % of nanowhiskers.

In some embodiments, the nanofiller includes cellulose nanowhiskers. The cellulose nanowhiskers may be stabilized with an acid. The acid may selected from the group consisting of $H_2SO_4$ and $H_3PO_4$. The cellulose nanowhiskers may be selected from the group consisting of acetobacter nanowhiskers and cotton nanowhiskers. The cellulose nanowhiskers may also include a type of cellulose selected from the group consisting of tunicate cellulose, bacterial cellulose, Kraft pulp cellulose, spruce cellulose, sugar beet cellulose, softwood pulp cellulose, ramie cellulose, sisal cellulose, and straw cellulose. The cellulose nanowhiskers may have an aspect ratio of at least about 10. In some embodiments, the aspect ratio is from about 10 to about 200. The cellulose nanowhiskers may have a diameter of about 6 nm to about 15 nm. The cellulose nanowhiskers may have a length from about 150 nm to about 3 µm. In an embodiment, the cellulose nanowhiskers are acetobacter nanowhiskers of diameters of about 10 nm to about 15 nm and lengths of about 1 µm to about 3 µm. In another embodiment, the cellulose nanowhiskers are cotton nanowhiskers of diameters of about 6 nm to about 12 nm and lengths of about 150 nm to about 200 nm. The solid electrolyte may comprise at least 0.5 wt. % of cellulose nanowhiskers. In an embodiment, the crystalline solid electrolyte comprises from about 0.5 to about 2.5 wt. % of cellulose nanowhiskers. In an embodiment, the solid electrolyte comprises about 1 wt. % of cellulose nanowhiskers.

In some embodiments, the nanofiller includes ceramic nanowhiskers. In some embodiments, the ceramic nanowhiskers are metal oxide nanowhiskers. Examples of metal oxide nanowhiskers include $TiO_2$, MgO, ZnO, $BaTiO_3$, $ZrO_2$, $PbTiO_3$, $Fe_2O_3$, $Fe_3O_4$.

In some embodiments, the nanofiller includes $Al_2O_3$ nanowhiskers. The $Al_2O_3$ nanowhiskers may have an aspect ratio of about 50 to about 200. The $Al_2O_3$ nanowhiskers may have a diameter of about 2 nm to about 4 nm. The $Al_2O_3$ nanowhiskers may have a length from about 200 nm to about 400 nm. The solid electrolyte may comprise from about 0.5 to about 2.5 wt. % of $Al_2O_3$ nanowhiskers. In an embodiment, the solid electrolyte comprises about 1 wt. % of $Al_2O_3$ nanowhiskers.

PEO and LiX mixture filled with nanowhiskers may have a layered structure at eutectic concentration. The cellulose nanowhiskers may have a lamellar structure, creating layers of PEO and $PEO_6LiX$ conducting tunnels. The solid electrolyte may comprise $PEO_6LiX$ conducting tunnels. The stability of the conducting tunnels is increased by the presence of nanowhisker fillers. Without being bound by theory, the nanowhiskers are believed to orient the tunnels in a high molecular weight matrix and enable faster Lithium conduction over longer distances. Nanowhiskers may be further aligned under electric field, magnetic field, or shear force to increase the conductivity.

Nanowhiskers can be aligned under DC or AC electrical field with a strength from 300V/cm to 30000V/cm. The range for AC field frequency can be from 0 MHz to 0.1 MHz. A magnetic field from 1 Tesla to 30 Tesla can also be applied to align the nanowhisker. In both electrical and magnetic alignment, increasing the field strength shorten the alignment time. The shear force can be used for alignment ranges from 10 MPa to 4000 MPa with a shear rate ranging from 0.001 to 1000 l/s.

PEO and LiX mixture have an eutectic composition. The EO/Li ratio may be 3 to 200. The eutectic ratio of EO/Li is 10 for $LiClO_4$. The increase in conduction when the solid electrolyte is filled with nanowhiskers is greatest for the eutectic composition.

Crystalline $PEO_6LiX$ complex may be formed with high molecular weight PEO, with an average molecular weight above about 3200 g/mol. In other embodiments, the PEO molecular weight is low, with an average molecular weight below about 3200 g/mol. In an embodiment, the average molecular weight of PEO is at least about 100K Da. In another embodiment, the average molecular weight of PEO is about 600K Da.

In some embodiments, the nanofiller has a conductivity at 20° C. of at least $10^{-5}$ S/cm. In some embodiments, the activation energy for Li conduction is less than 10 kJ/mol.

Experiments

Crystalline $PEO_6LiX$ complex has shown to be more conductive than amorphous counterparts. This conduction mechanism has never been used in room temperature application because the oligomeric PEO used in the original study melts at room temperature. Increasing the molecular weight of PEO introduces higher degree of disorder to the complex, entanglement of PEO chain and misalignment of $PEO_6$ channels decreases the conductivity. In embodiments, acidic cellulose nanowhisker assist the formation and stabilization of $PEO_6LiX$ crystalline complex at room temperature. The cellulose-polymer composite electrolyte has demonstrated improved conductivity, low transport activation energy, and higher mechanical strength. Zhou et al., Electrospun Polyethylene Oxide/Cellulose Nanocrystal Composite Nanofibrous Mats with Homogeneous and Heterogeneous Microstructures, *Biomacromolecules* 2011, 12, 2617-2625. X-ray diffraction (XRD) shows that $PEO_6LiX$ complex formation is faster with more acidic cellulose nanowhisker and the conductivity increases as long range crystalline domain forms. The energy barrier for Li hopping through $PEO_6$ channel decreases significantly as the cellulose surface acidity increases.

Polyethylene oxide (PEO) based solid polymer electrolytes are an attractive alternative to the flammable and toxic liquid/gel electrolytes currently used in rechargeable lithium ion batteries. Traditionally, ion conduction in PEO based electrolyte is dominated by ion hopping between $Li^+$ coordination sites in amorphous matrix and the conductivity is highly coupled with polymer motion. To increase the conductivity, the mechanical property of the electrolyte has to be sacrificed. This promotes the growth of dendrite (Li metal extension from the electrodes) and shortens the battery life. An alternative conduction mechanism is conduction through $PEO_6LiX$ complex which has been shown to be more conductive than its amorphous counterparts with same salt concentration. Since the discovery of $PEO_6LiX$ complex structure in 1999, it has never been used in battery application because oligomeric PEO used in the original study melts at room temperature.

Long molecular weight PEO can be used to obtain a solid state electrolyte at room temperature. However, the chain entanglement prevents the formation of $PEO_6LiX$ complex structure and misalignment of $PEO_6$ channels decreases the conductivity. Another option to improve the conductivity and mechanical strength is adding ceramic nanoparticles to the amorphous polymer matrix. Previous studies have shown these nanoparticles can influence the crystallization of PEO chains; create kinetically trapped amorphous domains and increase the ionic conductivity. These studies mostly focus on low salt concentration with ether oxygen to $Li^+$ ratio (EO:Li) higher than 8. At higher salt concentration, presence of large amount $Li^+$ coordinates with polymer chains, slows down the polymer dynamic, and decreases the conductivity in amorphous domain. Therefore, composite with high salt concentration has rarely been a point of interest.

Figure 1B:
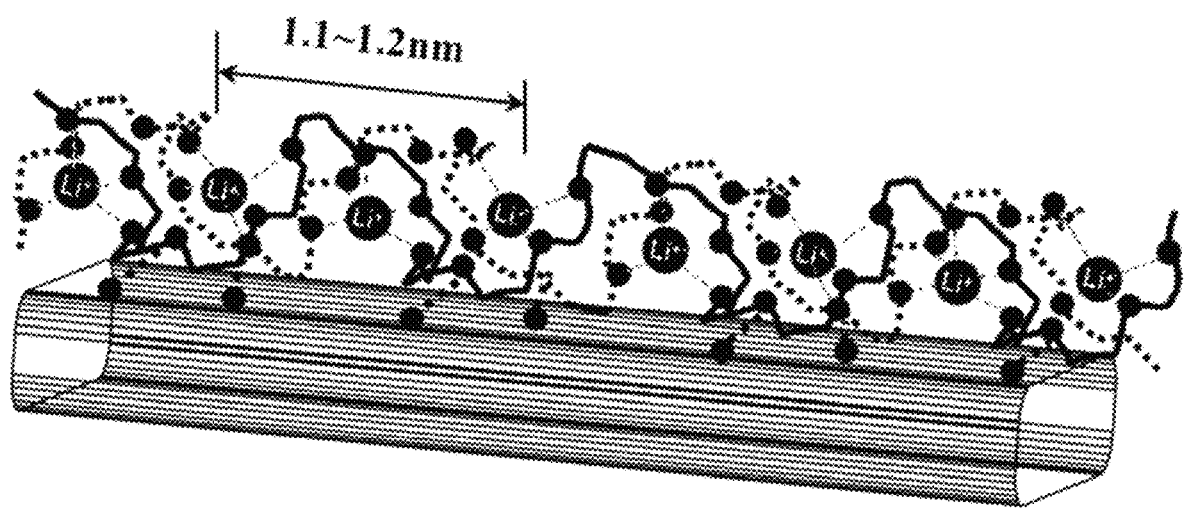
FIG. 1B shows formation of $PEO_6$ channel on the surface of cellulose.
Figure 1C:
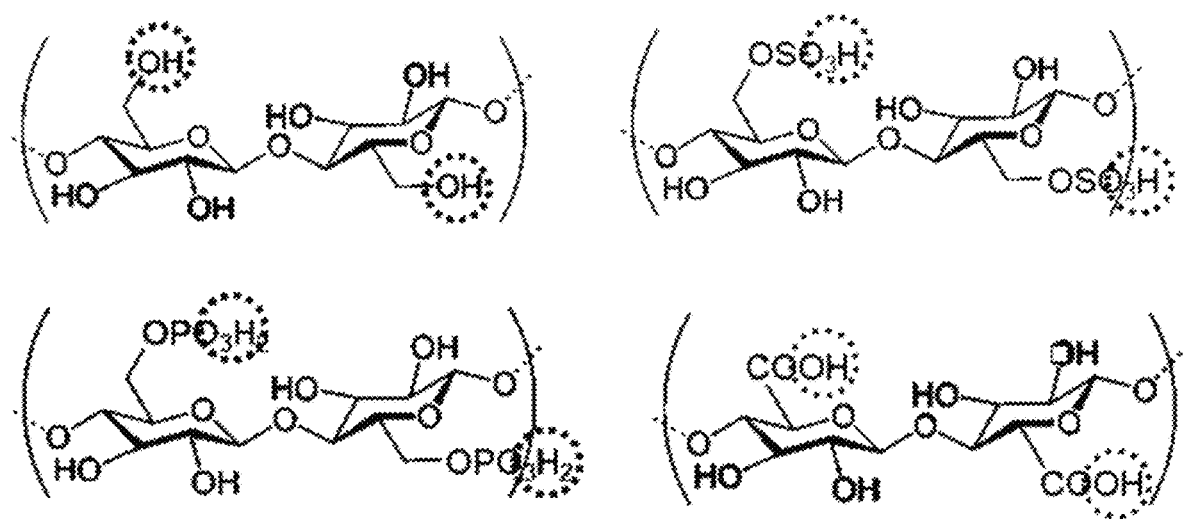
FIG. 1C shows cellulose nanowhiskers with different surface chemistry, including an amorphous structure without filler and crystalline structures with cellulose nanowhiskers treated by $H_2SO_4$ and $H_3PO_4$, and oxidizer.
Figure 1D:
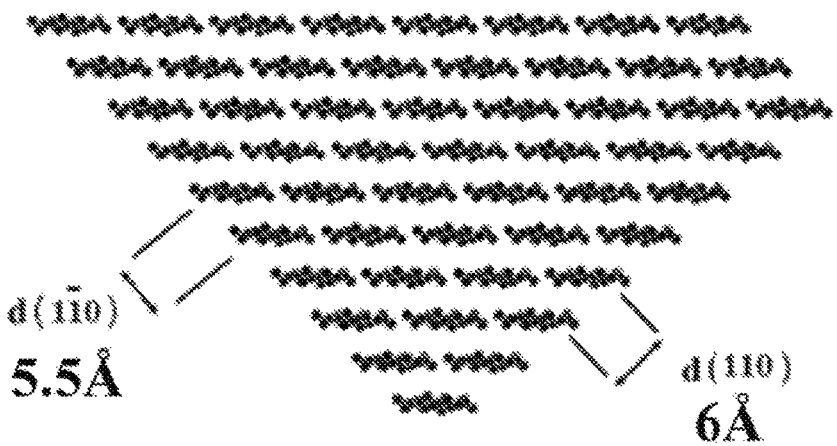
FIG. 1D shows lattice parameters of cellulose nanowhisker.
Figure 1D:
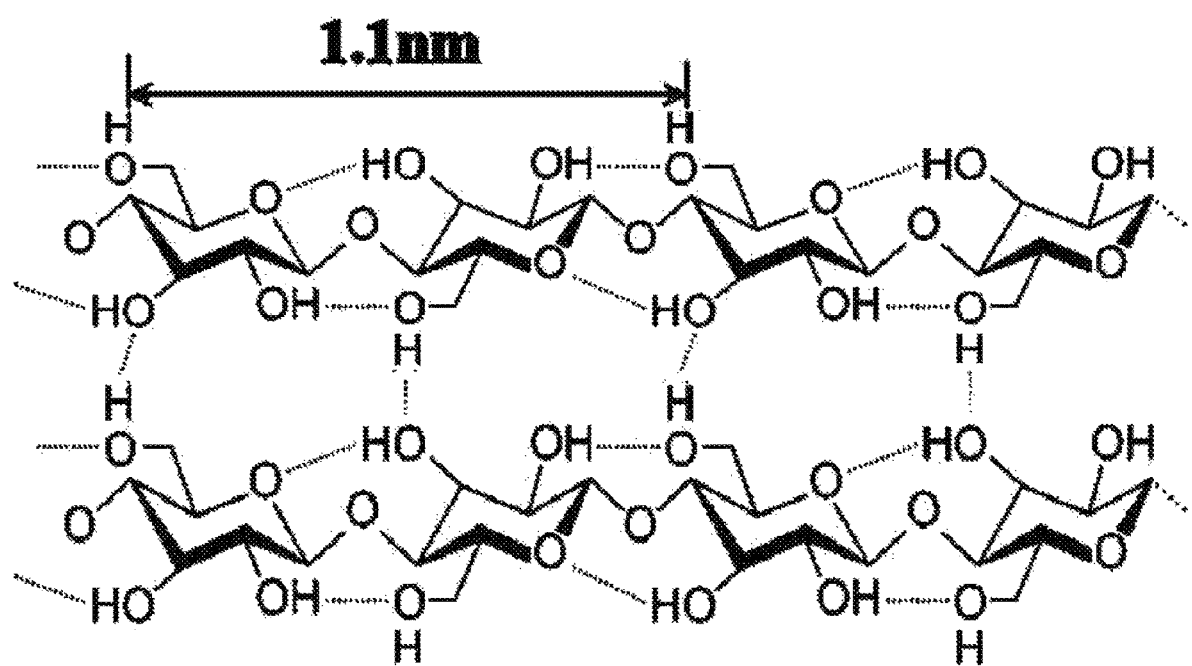

In the experiments described below, the salt concentration of EO:Li=6:1, as this is the concentration for $PEO_6LiX$ to form in the phase diagram. Cellulose nanowhiskers (CNWs) are used as the nanofiller for this study because cellulose is abundant and environment friendly compared with heavy metal ceramic fillers. These nanowhiskers has been used as reinforce agent in various polymer matrixes including PEO. In this study, the CNWs concentration is 1 wt % because this is above the percolation threshold of cylindrical fillers in composite. As demonstrated in FIG. 1D, untreated crystalline cellulose has —OH group on the surface, the Lewis-acid character makes it possible to interact with ether oxygen on PEO chain. The distance between primary alcohol groups on cellulose surface along the axial direction is about 1.1 nm. The lattice parameter of $PEO_6LiX$ crystal along the channel direction is about 1.1 nm to 1.2 nm based on the anion chemistry. In this scenario, CNWs can work as the nucleation site for the formation of $PEO_6LiClO_4$ crystalline structure and decrease the free energy barrier of nucleation process on the surface. To manipulate the interaction strength between cellulose surface and PEO, the primary alcohol groups are chemically modified and produce varieties of acidic surfaces include —$OSO_3H$, —$OPO_3H_2$, —COOH, and —OH. The pKa of —$OSO_3H$, —$OPO_3H_2$ groups are less than 3, indicating strong acidity. Both —COOH and —OH surfaces have significantly weaker acidity.

Figure 1E:
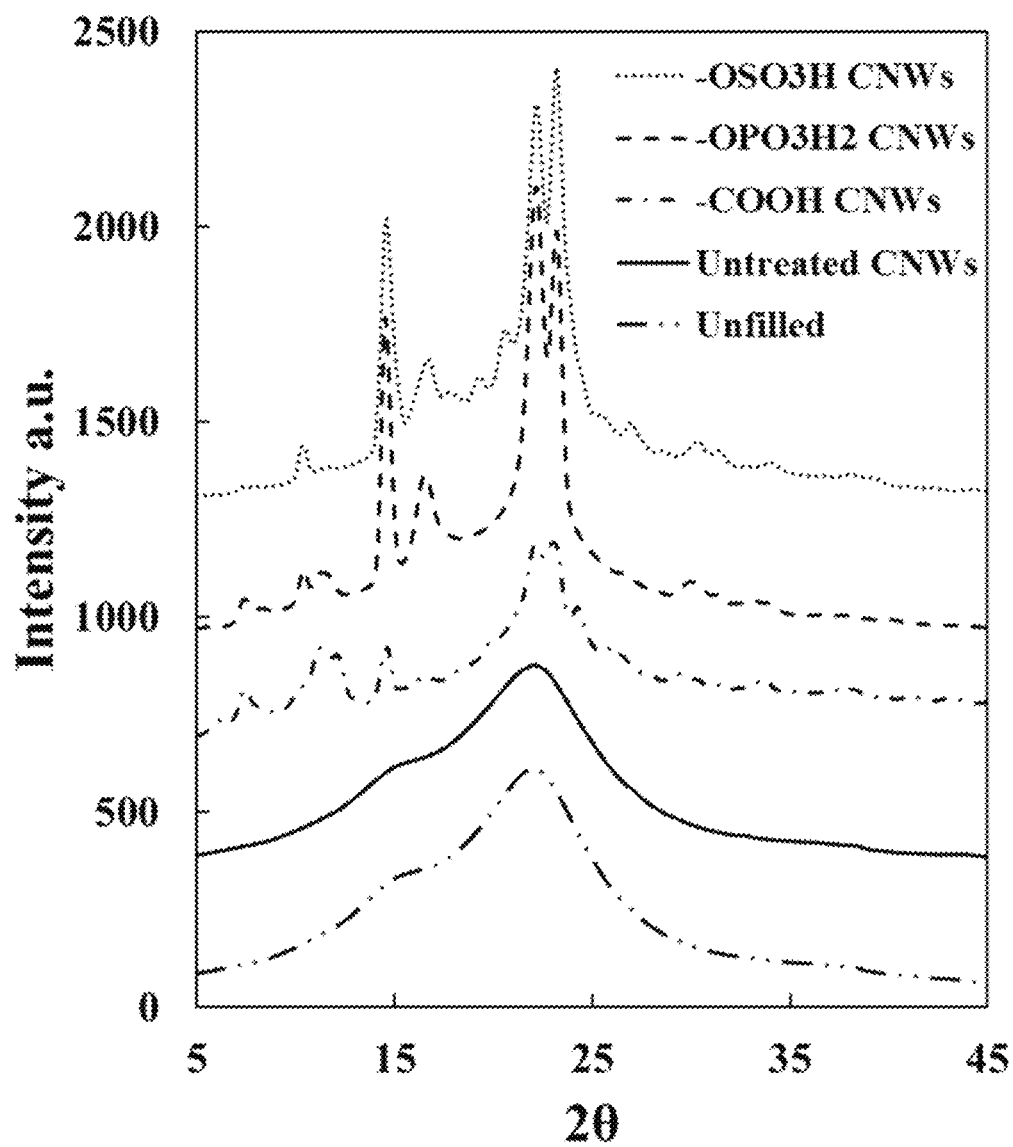
FIG. 1E shows a graph of intensity from X-ray diffraction of cellulose-polymer composite electrolyte with different cells including an amorphous structure without filler and other crystalline structures with cellulose nanowhiskers treated by $H_2SO_4$ and $H_3PO_4$, and oxidizer.
Figure 1F:
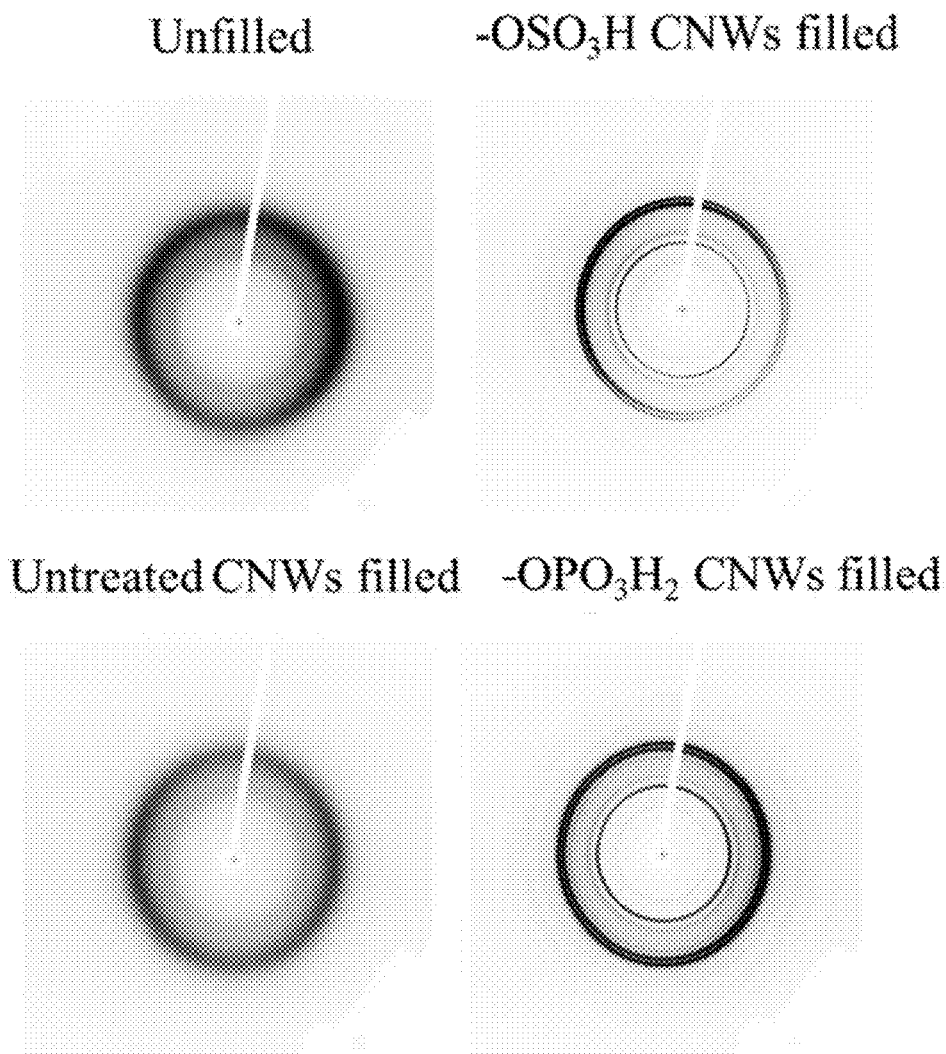
FIG. 1F shows a 2-D image of wide angle X-ray scattering of cellulose-polymer composite electrolyte with different cells including an amorphous structure without filler and other crystalline structures with cellulose nanowhiskers treated by $H_2SO_4$ and $H_3PO_4$, and oxidizer.

Cellulose Enhance $PEO_6LiClO_4$ Crystallization $PEO_6LiX$ crystallization is dependent on the molecular weight of PEO being used. In this study, to prevent the melting at room temperature, we use PEO with molecular weight of 600K Da. From our previous study, the crystallization can take as long as 7 days under thermal annealing. To monitor the effect of cellulose surface chemistry on crystallization kinetics, we measure the atomic structure of polymer film with 2D X-ray diffraction after 3 days of thermal annealing. As shown in FIG. 1E, without cellulose filler, the sample is amorphous. The diffuse scattering originates from the unparalleled orientation of $PEO_6$ channels. In this case, large $PEO_6LiClO_4$ crystalline domain is not formed due to large free energy barrier ($\Delta G_{homogeneous}$) prevent the formation of homogenous nucleation site and further reduced the growth rate. The sample remains amorphous with weak acidic —OH surface. In FIG. 1E, as the cellulose surface acidity further increases, diffraction peaks appears suggesting formation of crystalline $PEO_6LiClO_4$ domain. At acidic surface sites, the effective surface energy may be lower, thus diminishing the free energy barrier ($\Delta G_{heterogeneous}$) and facilitating nucleation. This can be demonstrated through equation listed below.

$$\Delta G_{heterogeneous} = \Delta G_{homogeneous} \times f(\theta)$$

$f(\theta)$ is a factor dependent on the contact angle, $\theta$. As the surface acidity increases, the wettability at the surface is improved, thus the contact angle and free energy barrier drops. Associated with the nucleate density increases, the crystal growth rate are increased in acidic nanowhisker filled SPEs.

Figure 1G:
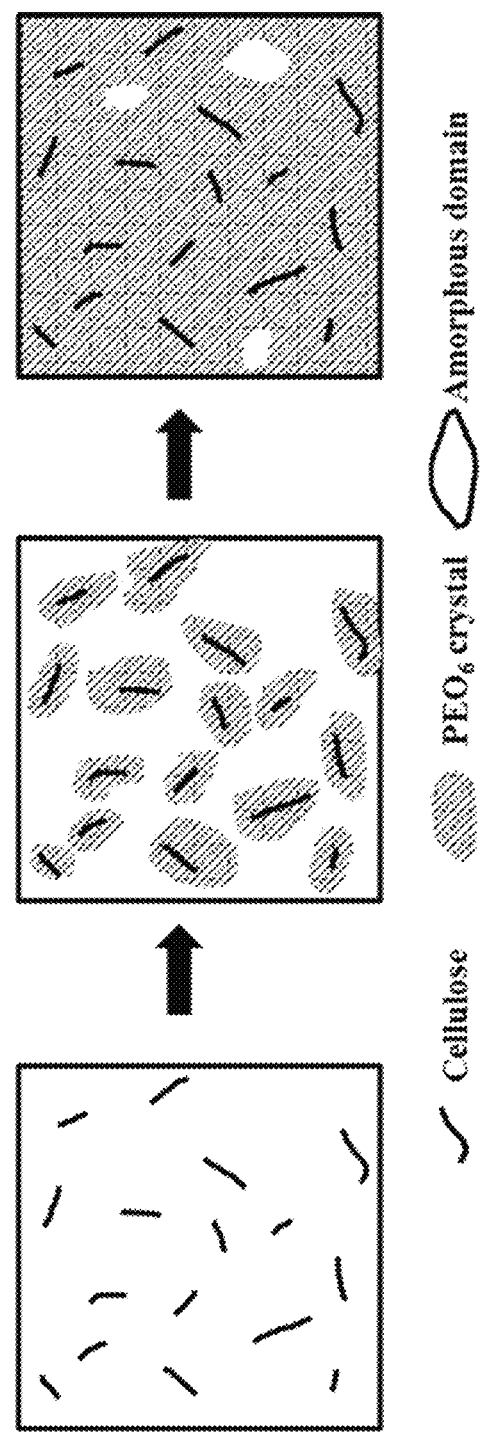
FIG. 1G shows the process of $PEO_6LiX$ crystallization on the surface of cellulose nanowhiskers in electrolyte.

In unfilled polymer sample with long molecular weight PEO at 6:1 ratio, the conductivity remains low despite the formation of $PEO_6LiClO_4$ domain after long annealing time. This is because individual $PEO_6$ channels can be misaligned at grain boundary causing a conduction barrier. Cellulose nanowhiskers function as a guide to form inter-connected conduction pathway along the surface of cellulose. As demonstrated in FIGS. 1B and 1G, the nucleation of $PEO_6LiClO_4$ happens along the surface of cellulose nanowhiskers. From the weight percentage of cellulose used, the nanofillers are expected to percolate. Utilizing this mechanism, the connectivity of the conductive $PEO_6LiClO_4$ crystalline domain is manually controlled and increases the overall conductivity.

Effect of Surface Acidity on $Li^+$ Conduction

Figure 2A:
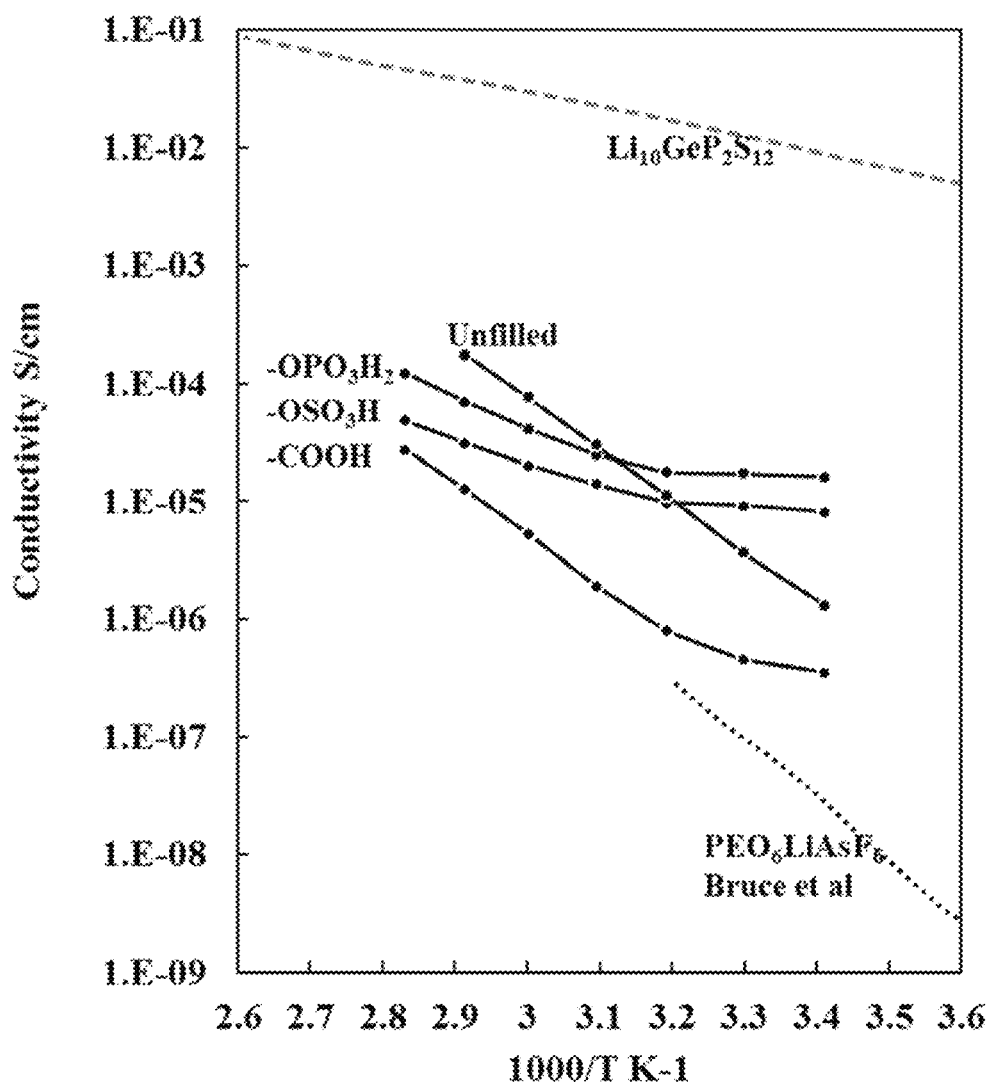
FIG. 2A shows a graph depicting the dependence of conductivity on temperature.

As discussed previously, the surface acidity of cellulose nanowhiskers affects the conductivity through structure. Typically, in an amorphous glassy conductor, the temperature dependence of conductivity follows Vogel-Fulcher-Tammann (VFT) behavior. This is most common in PEO based electrolytes and single ion conductors as ion hopping in amorphous domain facilitates the conduction. When the material has ordered conductive structure such as crystalline ceramic conductors, the conductivity follows Arrhenius temperature dependence. The temperature dependence of conductivity of cellulose-polymer composite electrolytes is shown in FIG. 2A. Compared with concave down VFT temperature dependence curve, the temperature dependence of high acidity cellulose filled samples is concave up. Because the conductivity is relatively independent of temperature around 20-50° C., we are able to obtain conductivity higher than $10^{-5}$ S/cm at 20° C. with high acidity CNWs. This is significantly improved over other amorphous PEO based electrolytes and $PEO_6$ based electrolytes that were previously reported. Most PEO+salt based electrolytes have room temperature (20° C.) conductivity below $10^{-6}$ S/cm, this can be further improved by adding ceramic nanoparticles. However, the effect of conductivity improvement is still not satisfying and the conductivity drops rapidly as the temperature decreases. Around room temperature, when strongly acidic CNWs present, the log($\sigma$) of electrolyte increases linearly with inverse temperature. This suggests the predominant conduction mechanism is Li hopping through crystalline $PEO_6LiClO_4$ complex. Above 50° C., PEO domain melts, the amorphous domain become highly conductive and this also affect the local environment of $PEO_6LiClO_4$ complex, the log($\sigma$) starts to deviate from original linear increase. From unfilled electrolyte to high acidity CNWs filled electrolyte, as the PEO$_6$LiClO$_4$ crystallinity increases, the transition in conduction mechanism become more evident.

Figure 2B:
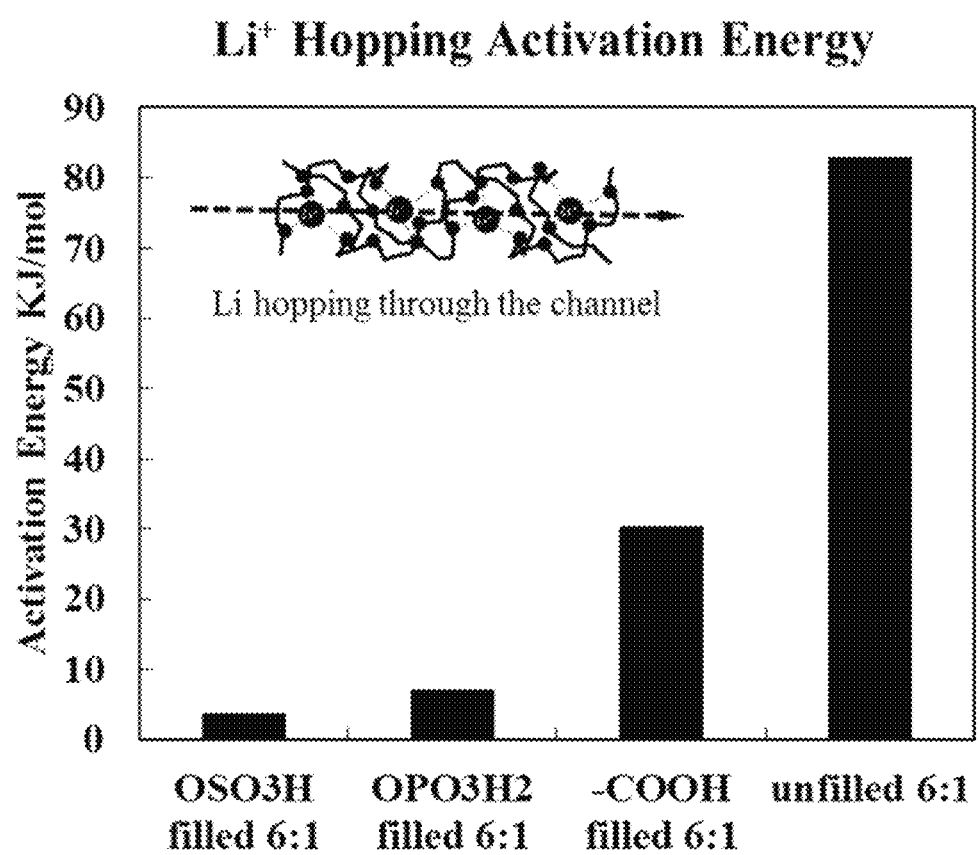
FIG. 2B shows activation energy as a function of nanowhisker surface acidity.
Figure 2C:
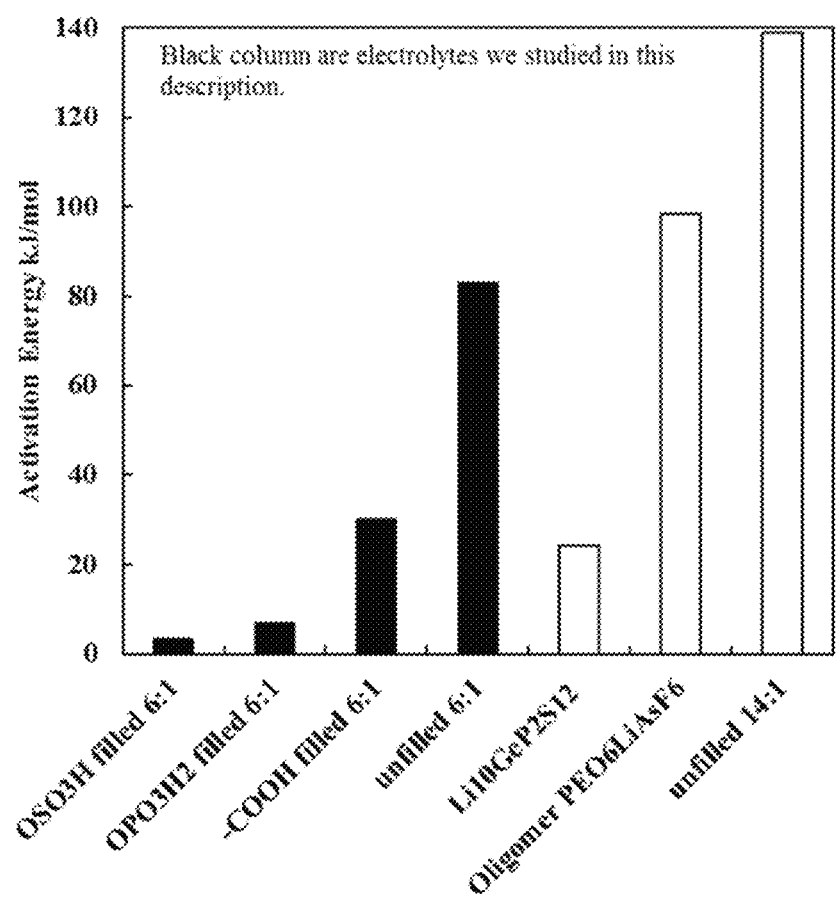
FIG. 2C shows activation energy of cellulose-polymer composite electrolyte compared with other electrolytes available.
Figure 2D:
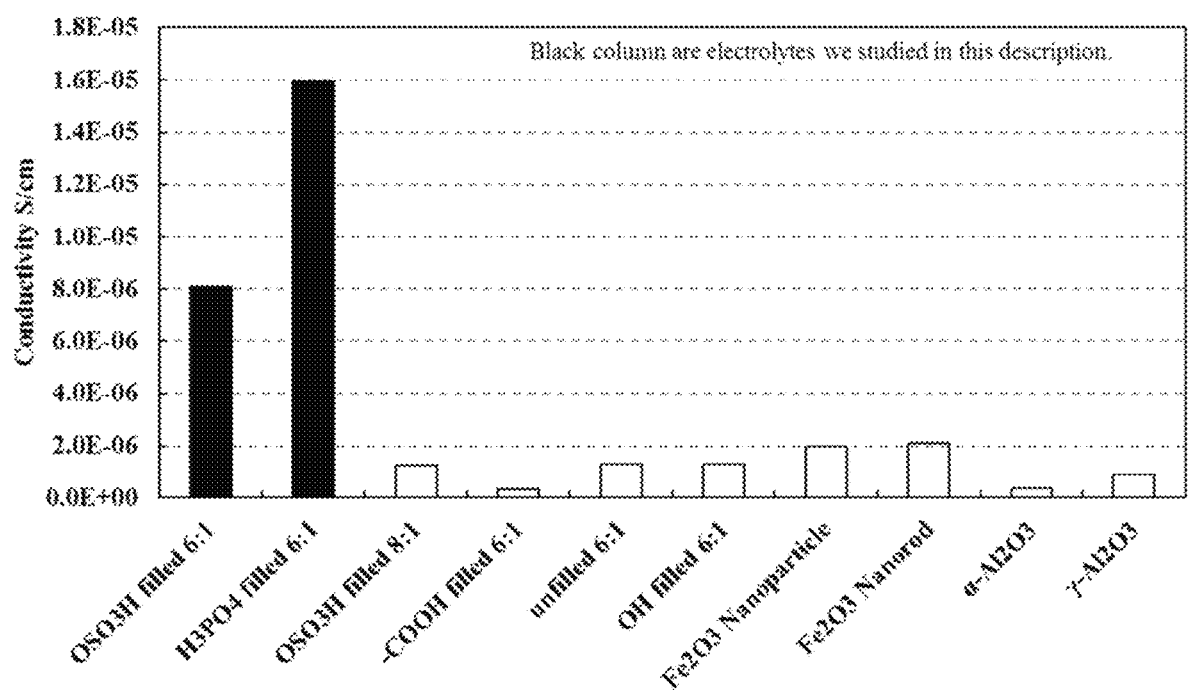
FIG. 2D shows conductivity at room temperature (20° C.) compared with other composite electrolytes available.

The activation energy of Li transport around the room temperature is calculated from Arrhenius equation and plotted in FIG. 2B. The activation energy of unfilled sample is similar compared with oligomeric PEO$_6$LiAsF$_6$ single crystal confirming the crystalline conduction mechanism. From FIG. 2B, addition of CNWs decreases the energy barrier for Li hopping through the PEO$_6$ channel. In composite electrolytes, as the surface acidity increases, the activation energy drops to as low as 7 kJ/mol, suggesting adding acidic cellulose lowers the energy penalty for Li hopping between neighbor coordination sites in PEO$_6$ channel. This is significantly improved over energy barrier for conduction through amorphous PEO domain (usually above 60 kJ/mol). As polymer motion in amorphous domain is coupled with conduction, we believe the nature of low activation energy is related to PEO$_6$ dynamic. As previously reported, PEO$_6$ channel undergo jump rotation over multiple sites in nanoseconds time scale, different surface acidic groups possess a variety of interaction strength with the PEO$_6$ channel and the rotation behavior of PEO$_6$ is expected to be different.

Functionalized cellulose nanowhiskers may be used as fillers in PEO based composite electrolyte. The presence of acidic cellulose aids the nucleation of PEO$_6$LiClO$_4$ crystalline complex in solid polymer electrolytes. With a percolated PEO$_6$LiClO$_4$ crystalline complex, high room temperature conductivity may be obtained. Neutron scattering measurement suggests that the nanowhisker surface only affects the polymer dynamics around room temperature. Across all the samples and temperatures, the polymer dynamics are decoupled with the conductivity. The activation energy of conduction around room temperature is significantly decreased as the cellulose surface acidity increases. This may originate from the difference in PEO$_6$ geometry as the surface acidity changes. As the surface becomes more acidic, the ester oxygen-Li distance increases and the rotation dynamic becomes stabilized which provide a stable pathway for Li conduction.

As used in the specification, "nanofiller" and "nanowhiskers" refer to structures with a size less than 10 µm in at least one dimension. In some nanowhiskers, the smallest dimension is the diameter and is less than 100 nm.

As used in the specification, "aspect ratio" refers to the ratio of the length in the longest dimension to a perpendicular dimension. For a roughly cylindrical nanowhisker, the aspect ratio is the ratio of the length to the diameter. Because cellulose nanowhiskers are not perfectly round, diameter is used as a measurement because the resolution limit of existing microscopy techniques does not permit inclusion of exact dimensions.

Experimental Details

Sample preparation. Unfilled PEO+LiClO$_4$ solid electrolyte samples were prepared with ether oxygen to lithium ratios (EO/Li) of 6:1, 8:1, 10:1 (eutectic) and 14:1. Neutral γ-Al$_2$O$_3$ nanowhiskers [Sigma Aldrich, 2-4 nm in diameter and 200-400 nm in length (aspect ratio ~100)] and cellulose nanowhiskers were dried for 48 hours at 120° C. in a vacuum oven, and then added to nanowhisker-filled electrolytes at 1, 2.5, and 5 wt % loading. The commercially available PEO used for PEO+LiClO$_4$+ ceramic nanowhisker conductivity and thermal measurements is from Sigma Aldrich and has a $M_w$ of 500,000 g/gmol. GPC standard grade PEO (Polymer Standards Services, $M_w$ 600,000 g/gmol) was used for conductivity and thermal behavior study of PEO+LiClO$_4$+cellulose nanowhiskers, neutron scattering studies and electron microscopy imaging.

PEO and LiClO$_4$ (Aldrich) were dissolved in anhydrous acetonitrile (Aldrich) and stirred for 24 hours in Teflon beakers covered with lids. For nanowhisker-filled samples, the nanowhiskers were ultra-sonicated in acetonitrile for 2 hours, added to the stirred PEO+LiClO$_4$+acetonitrile mixture, and sonicated for 3 hours. The lids were removed and acetonitrile was allowed to evaporate in the hood while stirring, leaving behind the electrolyte film. To limit exposure to air or water, all samples were dried in a vacuum oven at 75° C. for 5 days and transferred in a desiccator for characterization. Neutron scattering measurements are performed in vacuum, and conductivity measurements in nitrogen. Samples were hot pressed at 100° C. into films of uniform thickness for conductivity and neutron scattering measurements as described in reference Copley, J. R. D.; Cook, J. C. *Chem. Phys.* 2003, 292, 477-485.

Ion Conductivity Measurements. A Novocontrol GmbH concept 40 broadband dielectric spectrometer was used to measure conductivity. Uniform electrolyte discs (10 mm diameter and 0.2 mm thick) were sandwiched between brass electrodes with Teflon spacers and heated to 100° C. in a vacuum oven to ensure good interfacial contact. in the frequency range of 1 Hz-1 MHz and temperature range of 20-100° C. Conductivity of alumina nanowhisker filled electrolytes are collected in the second heat cycle. Conductivity of cellulose nanowhisker filled electrolytes are collected in the first heat cycle.

Thermal Analysis. A TA Instruments Q2000 differential scanning calorimeter (DSC) calibrated with indium standard determined thermal transitions in all samples. Samples sealed hermetically in aluminum pans weigh 8-10 mg. Temperature scans performed in the range −80° C. to +120° C. have a heating rate of 10° C./min and a cooling rate of 5° C./min. From the phase diagram of PEO+LiClO$_4$, two crystalline phases form: pure PEO, and PEO$_6$:LiClO$_4$ (See Johansson, P.; Ratner, M. A.; Shriver, D. F. *J. Phys. Chem. B* 2001, 105, 9016-9021), which takes 7 days to form at room temperature, and thus can be avoided with appropriate thermal history. For all the data presented here, samples were not held below the melting point for more than 2 hours, and thus PEO$_6$:LiClO$_4$ is not expected. Thus, any crystallinity detected is pure PEO, and the crystal fraction is calculated using the perfect heat of fusion for PEO (203 J/g).

Quasi-elastic neutron scattering [QENS] assessed PEO segmental dynamics. To avoid multiple scattering, sample thicknesses of 80-90 µm were selected such that 10% of incident neutrons are scattered. Samples are wrapped in aluminum foil and sealed in annular aluminum cans in an Argon atmosphere. Due to the large incoherent scattering cross-section of hydrogen atoms and the hydrogen-rich PEO backbone, the QENS signal is dominated by incoherent scattering associated with the polymer, and is an indication of segmental motion in PEO. To measure over a wide frequency range, three different instruments were used: the disk chopper spectrometer (DCS) [See Copley, J. R. D.; Cook, J. C. *Chem. Phys.* 2003, 292, 477-485.] and the high flux backscattering spectrometer (HFBS) [See Meyer, A.; Dimeo, R. M.; Gehring, P. M.; Neumann, D. A. *Rev. Sci. Instrum.* 2003, 74, 2759-2777.] at the National Institute of Standards and Technology Center for Neutron Research, in Gaithersburg, Md., and the backscattering spectrometer (BASIS) [See Mamontov, E., and Herwig, K. W. *Review of Scientific Instruments* 2011, 82, 85-109.] at the Spallation Neutron Source, Oak Ridge National Laboratory in Oak Ridge, Tenn. The wavelength, accessible spatial scale, dynamic ranges, and energy resolution for the three spectrometers are listed in Table 1.

| Spectrometer | Wavelength of incoming neutron beam (Å) | Accessible spatial scale range Å$^{-1}$ | Dynamic range ps | Energy resolution μeV |
|---|---|---|---|---|
| DCS | 4.8 | 3-11 | 2-50 | 56.1 |
| BASIS | 6.4 | 4-11 | 40-800 | 3.5 |
| HFBS | 6.27 | 4-11 | 200-2500 | 0.85 |

To eliminate thermal history and void regions, all samples are heated to 100° C. prior to QENS measurements. Measurements were made at decreasing temperatures of 75° C., 50° C. and 25° C., allowing 1 hour at each temperature for equilibration. Scattered neutron intensities were corrected for detector efficiency with respect to vanadium standard, empty aluminum can and background scattering using Data Analysis and Visualization Environment (DAVE) software developed at NIST. (See Azuah, R. T.; Kneller, L. R.; Qiu, Y.; Tregenna-Piggott, P. L. W.; Brown, C. M.; Copley, J. R. D. Dimeo, R. M. *J. Res. Natl. Inst. Stan. Technol.* 2009, 114, 341).

Results and Discussion

Ionic conductivity of nanowhisker-filled SPEs compared to nanoparticle-filled SPEs. Because the composition 8:1 has high conductivity and does not readily crystallize PEO, prior nanoparticle filled PEO+LiClO$_4$ electrolytes use only this composition. Present measurements on surface chemistry effects of nanoparticles reveal that fillers enhance conductivity differently at various Li salt compositions. Nanowhiskers influence conductivity at different salt compositions [EO/Li=8, 10, 14]. Conductivity in unfilled and neutral γ-Al$_2$O$_3$ nanoparticle filled electrolytes at the same three compositions have been described previously [Zhang, P.; Yang, L. C.; Li, L. L.; Ding, M. L.; Wu, Y. P.; Holze, R. *J. Membr. Sci.* 2011, 379, 80-85, Do, N. S.; Schaetzl, D. M.; Dey, B.; Seabaugh, A. C.; Fullerton-Shirey, S. K. *J. Phys. Chem. C* 2012, 116, 21216-21223]. Spherical alumina particles enhance conductivity only at the eutectic composition (EO/Li=10); it is therefore reasonable to expect nanowhiskers of the same surface chemistry to improve conductivity only at the eutectic composition. At optimal nanofiller loading of 1 wt %, ionic conductivities of particle-filled and nanowhisker filled electrolytes at a range of compositions and temperatures are compared in FIG. 3A, FIG. 3B, and FIG. 3C.

Figure 4:
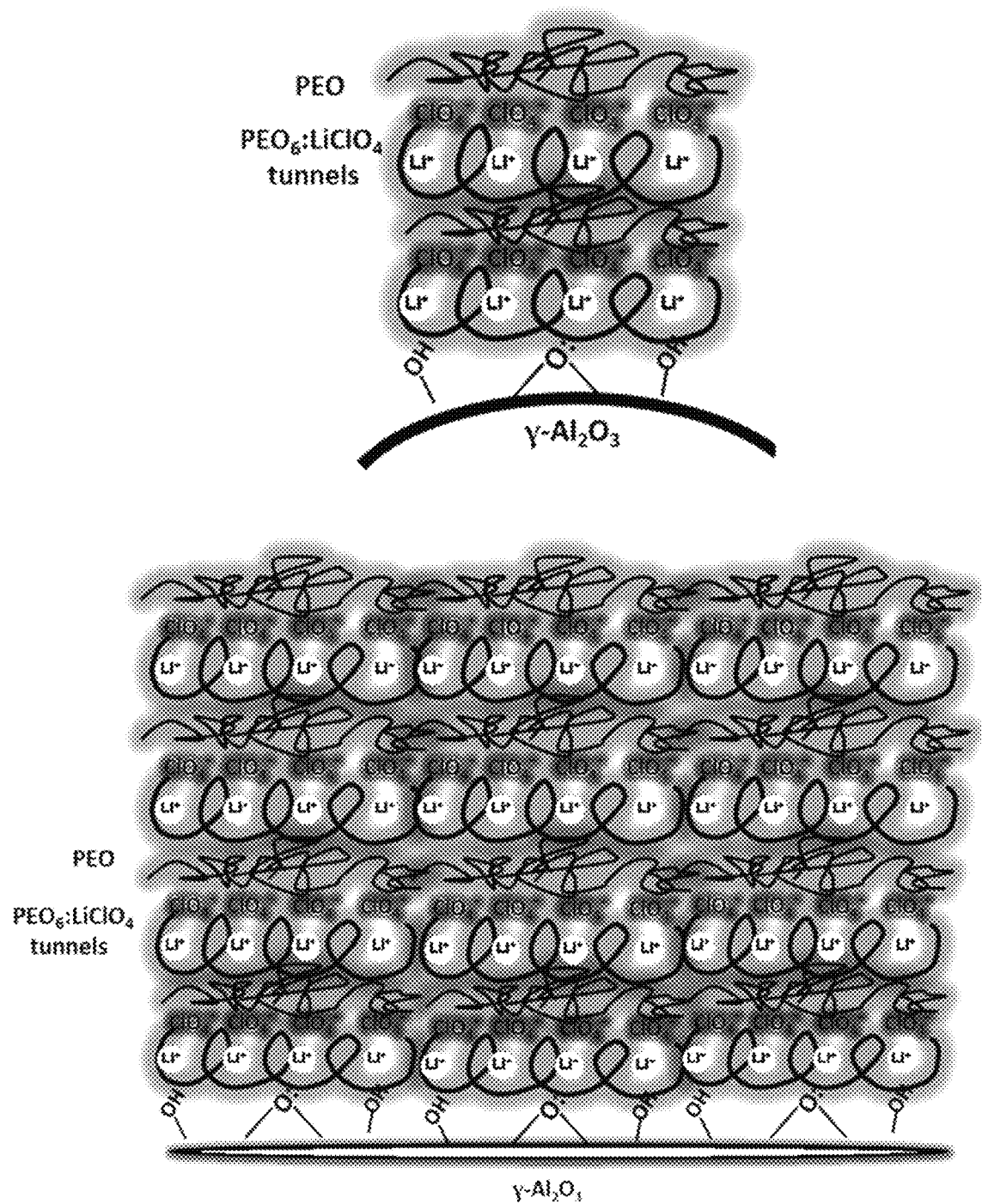
FIG. 4 shows isotropic nanofillers and anisotropic nanofillers with multiplay layers consisting of $PEO_6:LiClO_4$ tunnels.

In accordance with the hypothesis, nanowhiskers enhance conductivity significantly only at the eutectic composition. This further emphasizes on the importance and uniqueness of eutectic composition in nanofilled polymer electrolytes, where nanofillers promote the PEO$_6$: LiX tunnels. The highest impact with nanoparticles was obtained only at eutectic composition and the particles were found to stabilize the PEO$_6$ structures as evidenced by the rotational relaxation times. Without being bound by theory, while the curved nanoparticle surface can only stabilize fewer tunnels at its surface, the longer nanowhisker surface can support and stabilize more such tunnels. The nanowhiskers could orient the tunnels and enable faster lithium conduction over longer distances, as illustrated in FIG. 4.

Figure 5:
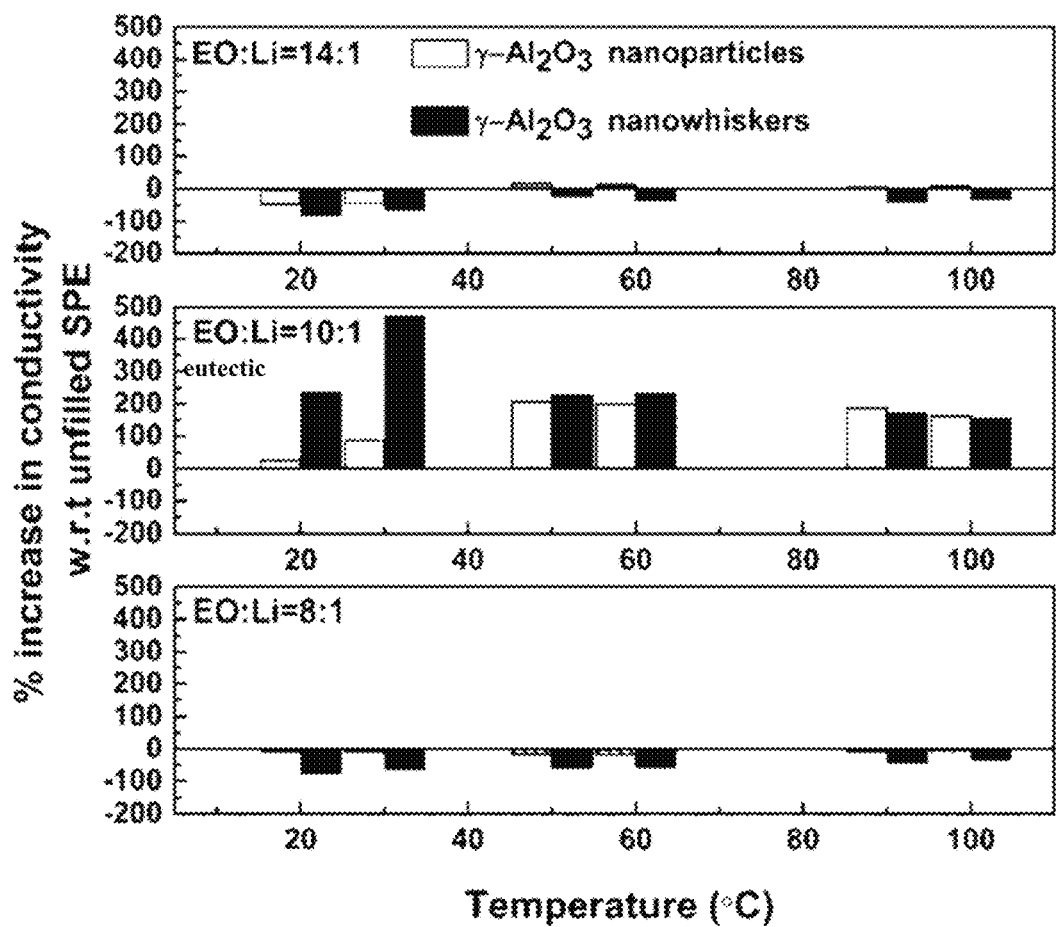
FIG. 5 shows the % increase in conductivity with nanowhiskers and particles in a range of EO/Li ratios and temperatures.
Figure 6:
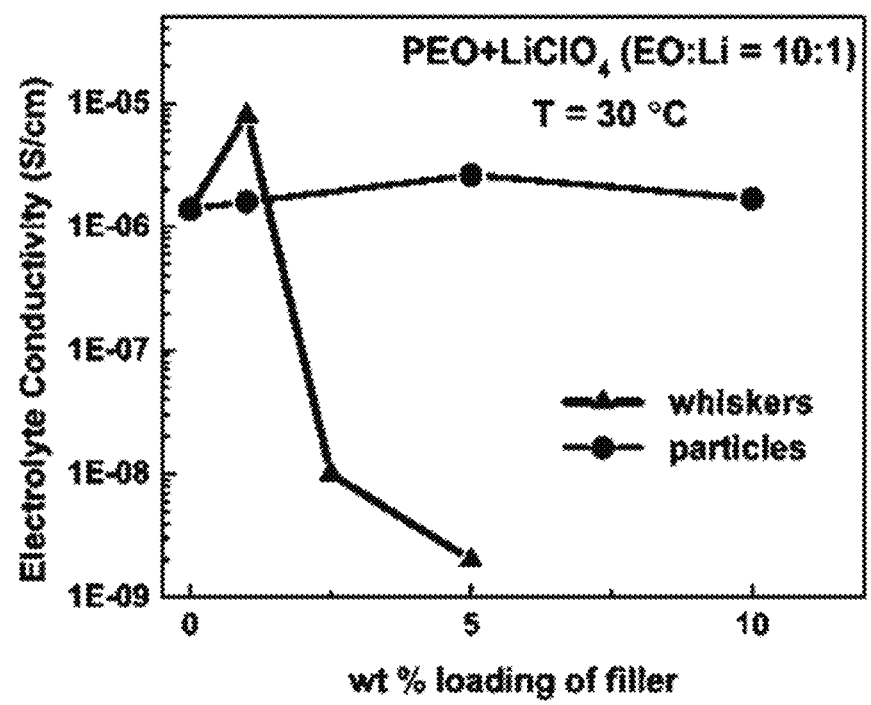
FIG. 6 shows the effect of filler loading on SPE conductivity in the presence of nanowhiskers and particles.
Figure 7:
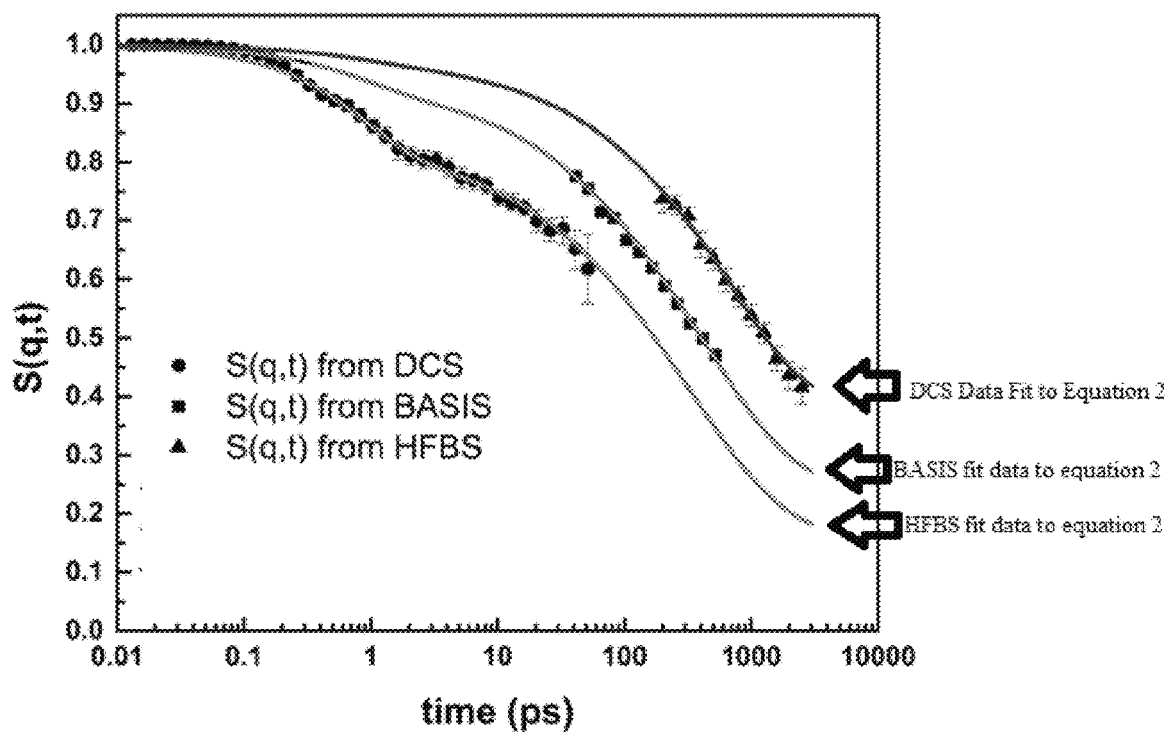
FIG. 7 shows QENS data for $PEO+LiClO_4$ (EO/Li=10:1) sample obtained from DCS, BASIS, and HFBS instruments fit to Equation 2.

As expected of the high shape anisotropy, optimal conductivity loading with nanowhiskers is only 1 wt %, while that for the spherical particles is 5 wt %, as shown in FIG. 5. At nanowhisker loadings higher than the optimal 1 wt %, ionic conductivity drops by several orders of magnitude. With spherical fillers, the drop in conductivity is not so significant when loading is increased from the optimal 5 wt % to 10 wt %. Thus the nanowhiskers could be affecting the segmental dynamics of PEO because of longer interfacial contact area between the nanowhiskers and the polymer. This needs to be verified via segmental dynamics measurements.

A quantitative description of the increase in conductivity with addition of nanowhiskers is depicted in FIG. 5. Nanowhiskers intensify the effect of spherical nanoparticles. At the eutectic composition, they increase conductivity more than the nanoparticles below PEO melting temperature, and at non-eutectic compositions, they decrease conductivity more than the nanoparticles at all temperatures. The diameters of the two fillers are similar, but the change in aspect ratio (1 to 100) improves conductivity by a factor of 5 at 30° C. Above the eutectic temperature of 50° C., nanowhiskers and particles provide similar increases in conductivity. The conductivity data shown here are collected in second heat cycle. Eutectic solidification occurs in the cool cycle that precedes the second heat cycle. Any structures stabilized at the nanowhisker surface continue to remain because of the long and continuous interface. When heated further, some of the top layers may melt away from the interface and thereby leave the conductivity equal to that of the particle-filled electrolytes. This result was verified with the EISF of PEO$_6$:LiClO$_4$ rotation. Higher increase in conductivity below $T_m$ (factor of 7 at 22 C) than above $T_m$ (factor of 2) is reported in PEO+LiClO$_4$ eutectic electrolyte filled with acidic α-Fe$_2$O$_3$ nanorods and in PEO+LiClO$_4$ (EO/Li=8) SPE filled with multi-wall carbon nanotubes. High aspect ratio fillers provide higher conductivity than the isotropic fillers and are thus more advantageous.

Thermal Transitions in Nanowhisker-Filled SPEs

Increase in conductivity with spherical nanoparticles is not accompanied by significant changes in Tg and crystallinity. The longer nanowhiskers could affect the thermal transitions differently by affecting how the polymer chain reorganizes during crystallization. To verify this, the Tg and crystal fraction in nanowhisker-filled SPEs is compared to particle-filled SPEs in Table 2. Nanowhiskers do affect the crystal fraction at the 1 wt % optimal loading. At higher loadings, crystal fraction increases slightly at the eutectic composition, suggesting that the optimal loading is too small to affect crystallization. Tg is not affected by the presence of nanowhiskers, which indicates that the segmental dynamics of PEO are unchanged in DSC window and needs further investigation.

TABLE 2

Tg and PEO crystal fraction in nanowhisker-filled SPEs compared to unfilled and particle-filled SPEs at various filler loadings obtained using DSC thermograms.

| EO/Li | unfilled | | 5 wt % particles | | 10 wt % particles | | 1 wt % nanowhiskers | | 5 wt % nanowhiskers | | 10 wt % nanowhiskers | |
|---|---|---|---|---|---|---|---|---|---|---|---|---|
| | $T_g$ | $X_c$ | $T_g$ | $X_c$ | $T_g$ | $X_c$ | $T_g$ | $X_c$ | $T_g$ | $X_c$ | $T_g$ | $X_c$ |
| 8:1 | −17.2 ± 2.1 | 0 | −18.2 ± 2.2 | 2 | −16.6 ± 2.6 | 1 | −18.8 ± 3.0 | 0 | −20.8 ± 2.0 | 0 | −20.3 ± 3.0 | 0 |
| 10:1 | −27.8 ± 2.3 | 2 | −25.9 ± 2.5 | 0 | −27.2 ± 2.4 | 0 | −29.5 ± 3.0 | 2 | −32.99 ± 3.0 | 3 | | |
| 14:1 | −15.0 ± 2.0 | 31 | −17.6 ± 1.9 | 27 | −13.0 ± 3.0 | 30 | −17.68 ± 3.0 | 29 | −15.48 ± 2.0 | 27 | −16.54 ± 3.0 | 29 |

Influence of Nanowhiskers on Dynamic Processes in SPEs.

Nanowhiskers enhance conductivity without any corresponding change in $T_g$ or crystallinity. When compared to spherical particles, nanowhiskers have a larger interface with PEO due to their long and continuous surfaces. Interaction between the acidic sites on nanowhiskers and ether oxygens in PEO over a long distance can slow down the polymer right next to the nanowhisker surface. Because lithium ion mobility depends on polymer dynamics, such an interaction can alter conductivity. We use QENS to measure PEO segmental dynamics as a function of nanofiller aspect ratio at three compositions (EO/Li=8, eutectic 10, and 14) filled with 1 wt % nanowhiskers. Dynamics at a higher nanowhisker loading of 5 wt % is measured only at the eutectic composition. The incoherent scattering intensity from PEO's H-atoms versus the energy is determined (S(q, ω) vs E) from the experiment.

The neutron intensities in the energy domain (S(q,ω)) are inverse-Fourier transformed to the self-intermediate scattering function (S(q,t)) in the time domain. The instrument resolution is accounted for using a vanadium standard that is immobile in the instrument window. S(q,t) is an autocorrelation function in atom position. The decay of S(q,t) is thus an indication of how fast the polymer segments move over Angstrom to nanometer length scales. For polymers, this is the segmental relaxation, sometimes called the α relaxation. The instruments DCS, BASIS, and HFBS that cover the desired range of time and length scales do not provide information on whole chain diffusion.

To characterize polymer mobility, fit the S(q,t) vs t data to a combination of stretched exponential functions and examine the spatial dependence of the fit parameters. For this, the Kohlrausch-William-Watts (KWW) equation was used. The KWW equation is widely used for describing segmental and rotational processes in polymers. (See Arrighi, V.; Higgins, J. S. *Phys. B: Condensed Matter* 1996, 226, 1-9).

$$S(q,t) = EISF + (1 - EISF)\exp\left[-\left(\frac{t}{\tau(q,T)}\right)^{\beta(q,T)}\right] \quad \text{Equation (1)}$$

The fitting parameters in the above equation include the segmental relaxation time (τ), the distribution of relaxation times (β), and the elastic incoherent structure factor (EISF) which describes the fraction of total scattered intensity that is outside the timescale of the instrument. In the case of rotational processes, EISF plotted as a function of q indicates the geometry of rotation.

Figure 3A:
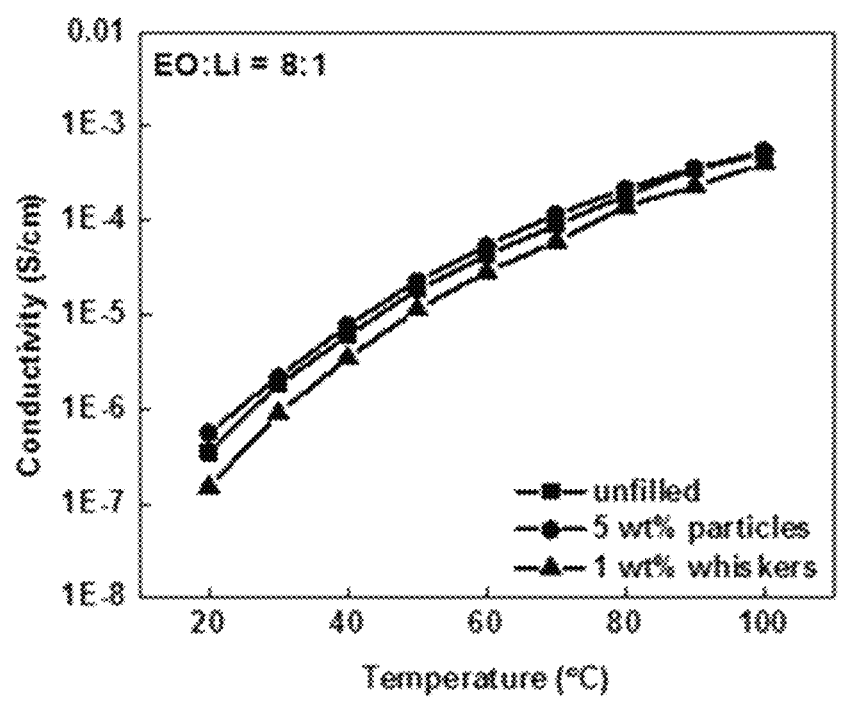
FIG. 3A, FIG. 3B, and FIG. 3C show ionic conductivity of unfilled, particle-filled and nanowhisker-filled electrolytes as a function of EO/Li ratio and temperature.
Figure 3B:
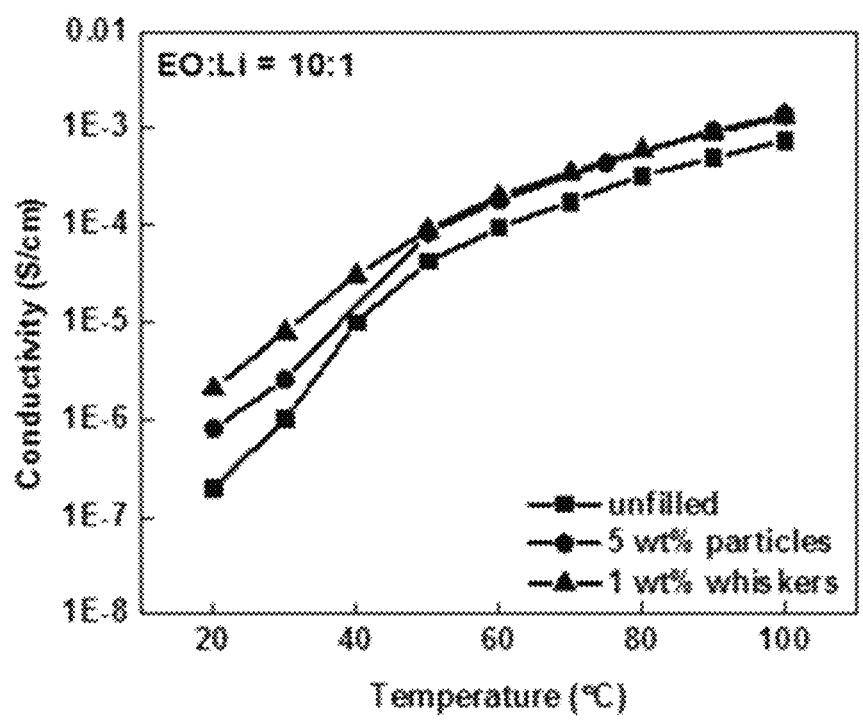
Figure 3C:
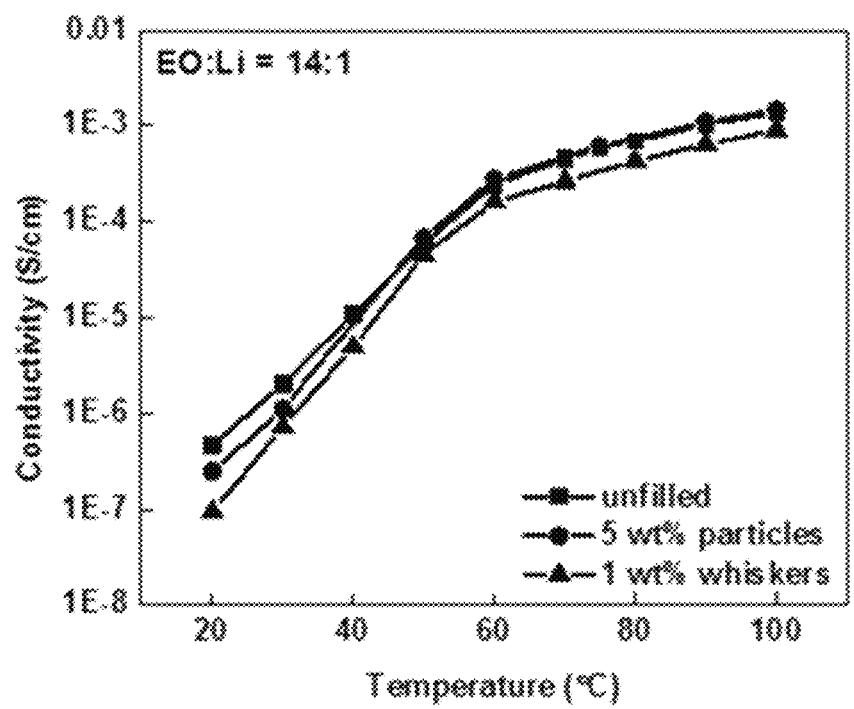

Consistent with other QENS data, (See Johansson, P.; Ratner, M. A.; Shriver, D. F. *J. Phys. Chem. B* 2001, 105, 9016-9021 and Fullerton-Shirey, S. K.; Maranas, J. K. *Macromolecules* 2009, 42, 2142-2156), hydrogen atoms in neutral nanowhisker-filled electrolytes participate in three processes: vibration, segmental relaxation of PEO and a rotational process consistent with a liquid analog of the $PEO_6$:$LiClO_4$ structure. The latter is apparent at 25° C. and 50° C., but is not prominent at 75° C. See Mao, G.; Saboungi, M-L.; Price, D. L.; Armand, Howells, W. S. *Phys. Rev. Lett.* 2000, 84, 5536-5539; Londono, J. D.; Anis, B. K.; Habenschuss, A.; Borodin, O.; Smith, G. D; Turner, J. Z.; Soper, A. K. *Macromolecules* 1997, 30, 7151-7157; and Mao, G.; Saboungi, M.-L. Badyal, Y. S.; Fischer, H. E. *Europhys. Lett.* 2001, 54, 347-353. The rotational process appears at or below the melting temperature, and may describe motion of partially formed $PEO_6$:$LiClO_4$ not detectable in thermal measurements. The new data on neutral γ-$Al_2O_3$ nanowhisker-filled SPEs is first described with vibration with segmental motion, only adding rotation if required to fit the data. Thus the dynamics in the samples are described using $$S(q,t) = KWW_0 KWW_1[x+(1-x)KWW_2] \quad \text{Equation (2)}$$

or $$S(q,t) = KWW_0 KWW_1 \quad \text{Equation (3)}$$

depending on whether the rotational process is active. Here $KWW_0$ corresponds to the fast vibration of H-atoms, $KWW_1$ corresponds to relaxation of PEO segments, $KWW_2$ describes the slower rotation of $PEO_6$:$LiClO_4$ remnants, and (1−x) is the fraction of hydrogen atoms that rotate in addition to vibration and segmental motion. By allowing the fraction of atoms that are immobile in each instrument window (EISF) to vary, Equation 2 or 3 can be used to fit data from all three instruments as shown in FIG. 3A, FIG. 3B, and FIG. 3C. In the case of DCS, BASIS, and the segmental process on HFBS, the EISF represents the fraction of segmental motion outside the window of the instrument, whereas the EISF from the rotational process on HFBS represents the geometry of the rotation. The data is displaced vertically because of the decreasing EISF (DCS>BASIS>HFBS) but can be rescaled to fall on a single curve. The fitting procedure involves constraining the parameters (2<$τ_1$<2000, 2<$τ_2$<2000, 0.5<$β_1$<0.6, $β_2$=1, and 0<EISF<1) and requiring that characteristic times do not vary with instrument. The elastic incoherent structure factor corresponding to the rotational process ($EISF_2$), which physically signifies the geometry of rotation, is also kept constant over the three instruments. The error bars on the fit parameters are obtained using a bootstrap algorithm, and represent one standard deviation from the average.

Figure 8:
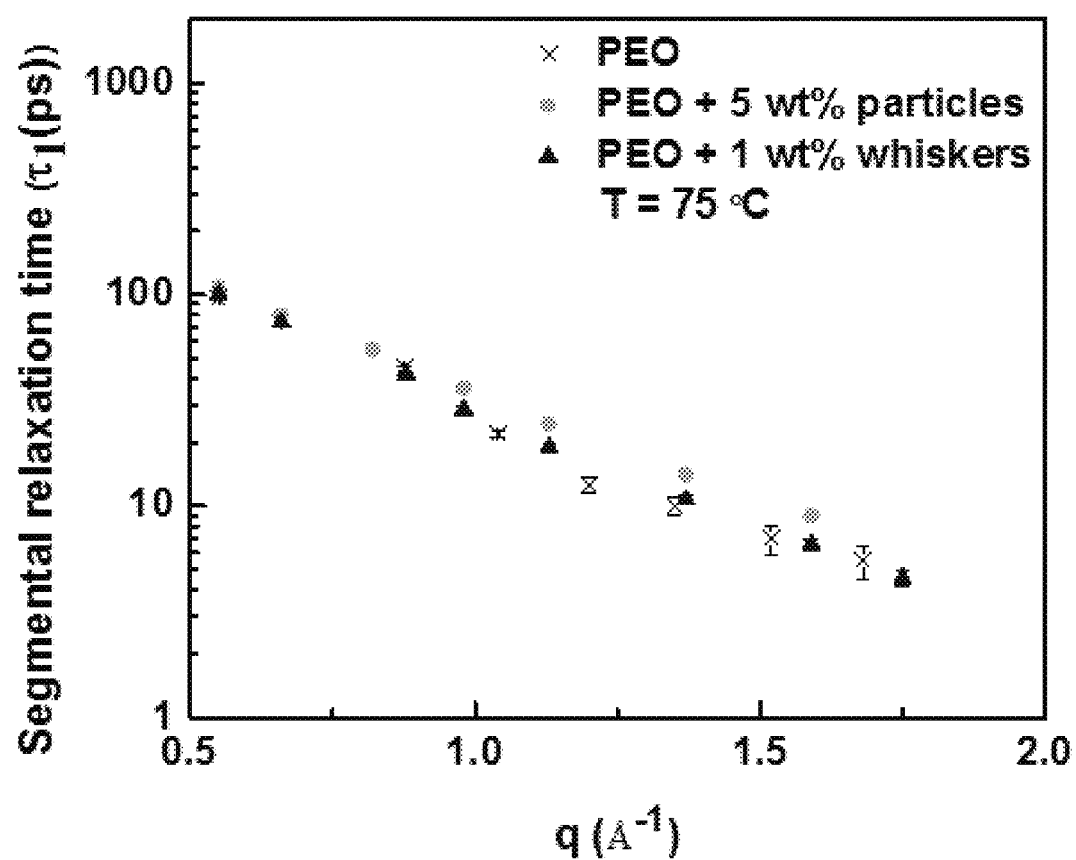
FIG. 8 shows the effect of fillers on PEO dynamics in the absence of salt.

Segmental dynamics of PEO in the presence of nanowhiskers. Because lithium ion motion depends on segmental dynamics of the PEO backbone, it is important to investigate the effects of filler addition on segmental mobility. As shown in FIG. 8, the addition of nanoparticles to PEO in the absence of salt causes little to no change in segmental mobility. In the case of nanowhiskers, larger interfacial contact between the polymer and the nanowhisker surface can occur over a longer and continuous distance, and slow down the polymer. FIG. 8 demonstrates the effect of nanofillers on segmental relaxation of PEO in the absence of salt. At optimal nanowhisker loading, segmental dynamics of PEO are not different from that of PEO in unfilled electrolyte. This may be attributed to the small nanowhisker loading corresponding to the optimal increase in conductivity (1 wt %). Nanofillers affect polymer dynamics significantly if they are dispersed well enough to have large interfacial contact with the polymer. Heavy aggregation of the nanowhiskers in the SPE matrix that reduce interfacial contact between the polymer and the nanofillers may explain unchanged polymer dynamics.

In the presence of salt, addition of spherical particles to the electrolytes did not change PEO dynamics at all compositions and temperatures. To investigate this effect in nanowhisker-filled SPEs, PEO relaxation times are shown in FIG. 8 at nanowhisker loading corresponding to optimal conductivity. PEO dynamics in nanowhisker-filled electrolytes at a range of salt compositions and temperatures are compared to PEO dynamics in the unfilled and particle-filled electrolytes. Segmental dynamics do not change at any given salt composition or temperature. This indicates that the ether oxygens are equally coordinated in all samples in the presence and absence of nanowhiskers and particles. Thus these results rule out changes in segmental dynamics as the mechanism by which nanowhiskers enhance conductivity.

Figure 9A:
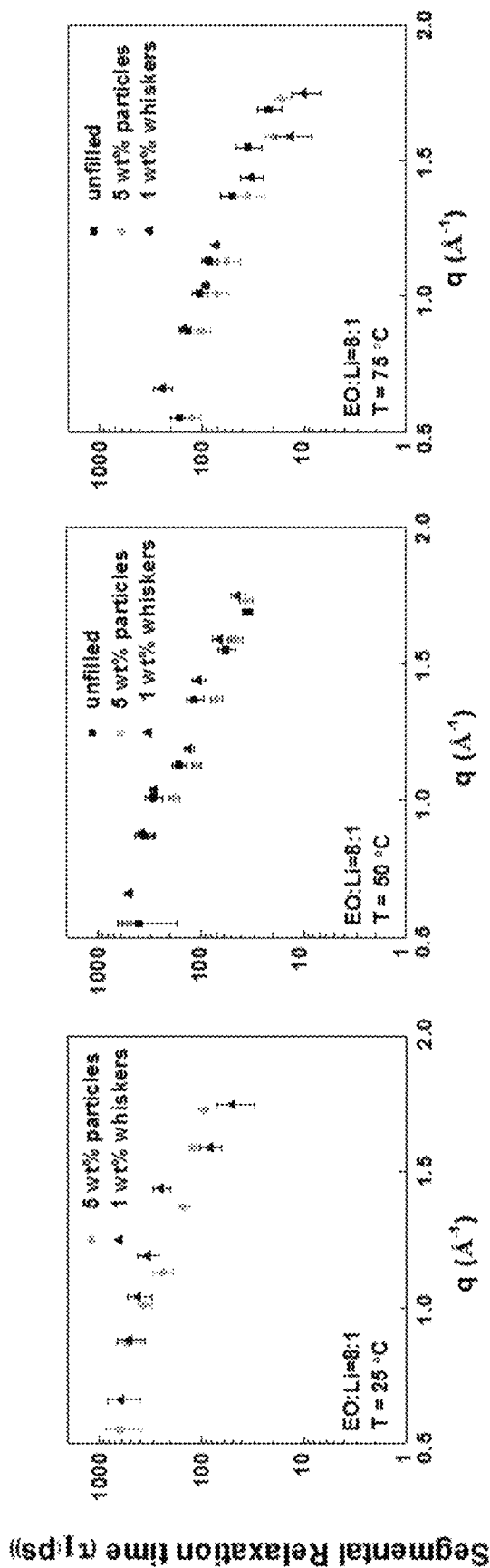
FIGS. 9A through 9C show segmental dynamics in nanowhisker and particle filled electrolytes compared to unfilled electrolyte at a range of EO/Li compositions and temperatures.
Figure 9B:
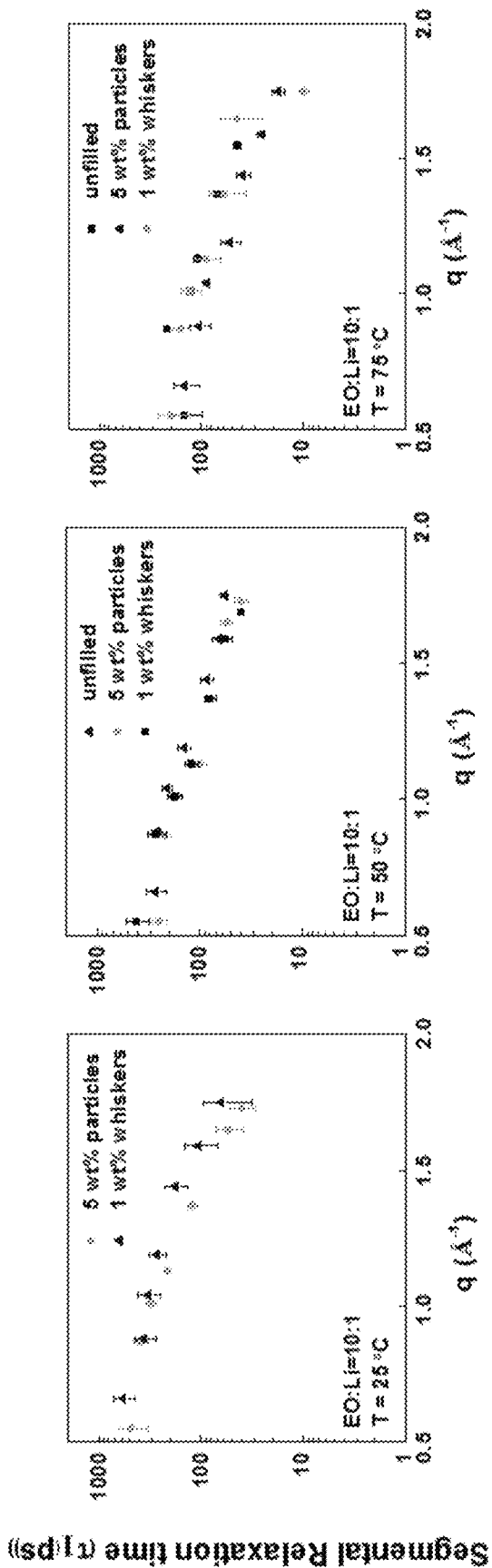
Figure 9C:
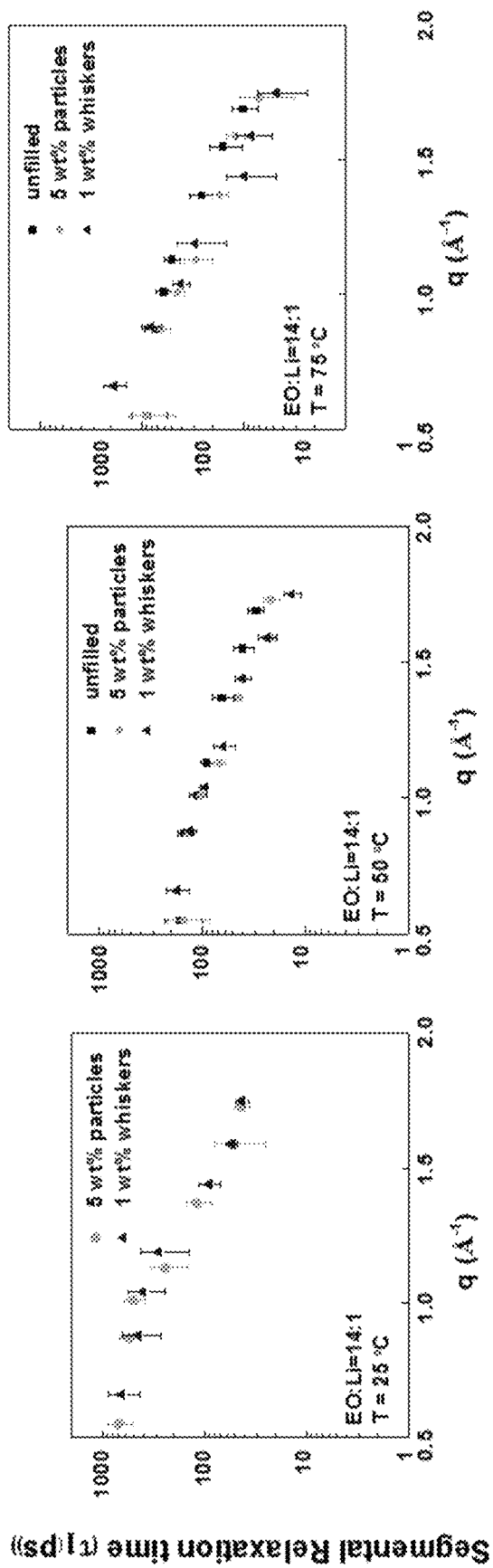
Figure 10:
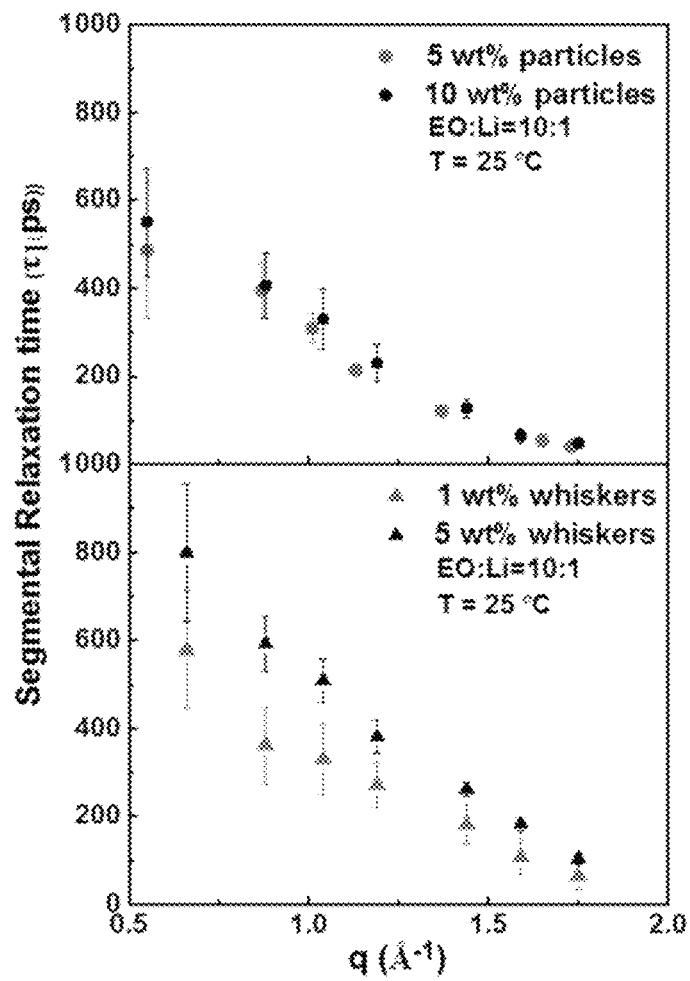
FIG. 10 shows segmental dynamics with nanowhiskers and particles at loadings greater than the loading of optimal conductivity.

For segmental dynamics at nanowhisker loadings greater than the optimal 1 wt %, nanowhiskers make the polymer slower at 5 wt % loading, as shown in FIG. 9C. The same is not true with particle loadings greater than the optimal of 5 wt % as illustrated in FIG. 9A. 10 wt % and 5 wt % loading of particles have similar effect on segmental dynamics, which is not different from the unfilled electrolyte. The effect of a longer and continuous nanowhisker-polymer interface becomes evident only at higher loadings of nanowhiskers. Although it is difficult to attribute this effect to differences in dispersion extents of the two filler types based on two-dimensional electron microscope images, this explains why there is a steep drop in conductivity presented in FIG. 5 with addition of nanowhiskers beyond the optimal loading. There are reports on changes in polymer chain conformations in polymer nanocomposites with anisotropic fillers; such changes were not observed in spherical particle-filled polymer composites. See Adebahr, Josefina, et al. Physical chemistry chemical physics 5.4 (2003): 720-725. Dynamics in these systems has not been well characterized in terms of particle shape and confinement effects. See Id. If slower PEO dynamics implies that anisotropic fillers lead to stretching of polymer chains near their surface due to interaction of acidic sites on the neutral nanowhiskers with multiple EOs on a single PEO chain, such an effect can also improve conductivity. See Wright, P. V.; Zheng, Y.; Bhatt, D.; Richardson, T.; Ungar, G. Polym. Int. 1998 47, 34; Golodnitsky, D.; Livshits, E.; Ulus, A.; Peled, E. Polym. Adv. Technol. 2002 13, 683-689; and Lascaud, S.; Perrier, M.; Valee, A.; Besner, S.; Prud'homme, J. Armand, M. Macromolecules 1994 27, 7469.

Although the decoupling of conductivity increase with segmental dynamics has been established for particle-filled electrolytes, it is important to verify the same for nanowhiskers because segmental dynamics is considered the most prominent Li transport mechanism in amorphous domains and majority of efforts have been directed towards enhancing segmental dynamics to improve conductivity. Exploiting such a mechanism which is decoupled from segmental dynamics can lead to higher conductivity increase than what is limited by PEO segmental motion. Interestingly there is no difference in segmental dynamics in particle and nanowhisker-filled electrolytes at optimal loading, but there is higher conductivity in the presence of nanowhiskers. In particle-filled electrolytes, particles restrict rotation of the conducting $PEO_6:LiClO_4$ tunnels. This is an indication of stabilization of the tunnels at the particle surface. We examine the rotational relaxation times and EISF to understand how nanowhiskers influence the rotation of $PEO_6:LiClO_4$ tunnels and how this correlates to the larger improvement in conductivity with nanowhiskers.

Figure 11A:
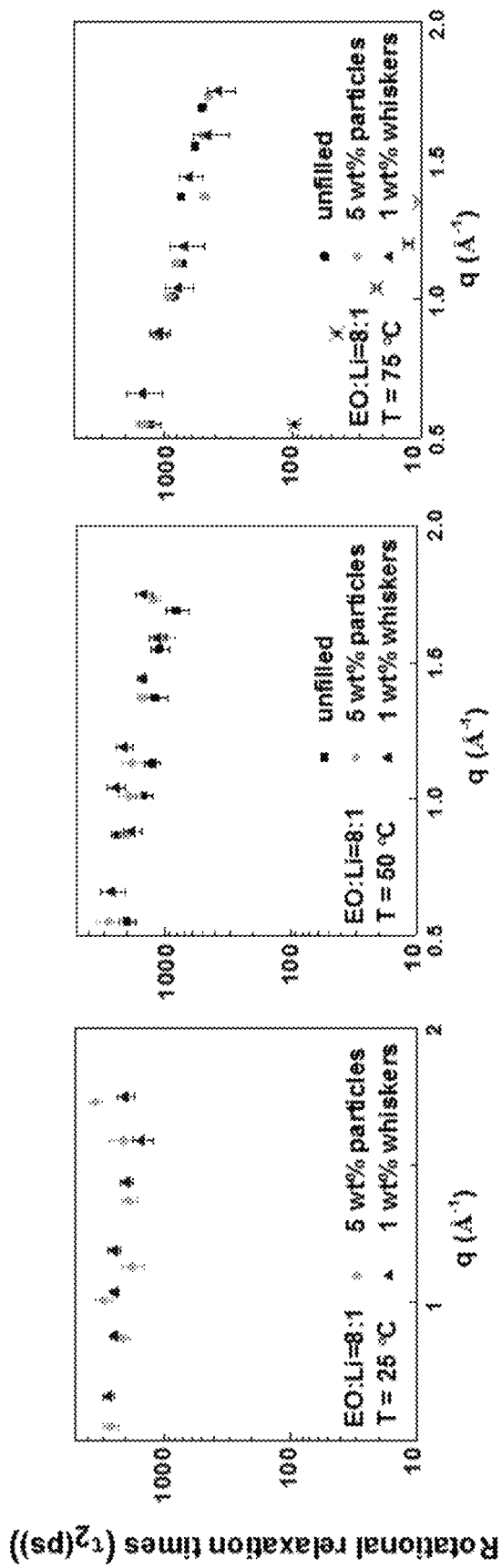
FIGS. 11A through 11C show the influence of nanowhiskers on rotational relaxation times of $PEO_6:LiClO_4$ tunnels compared to those in the particle-filled and unfilled electrolytes at a range of EO/Li compositions and temperatures.
Figure 11B:
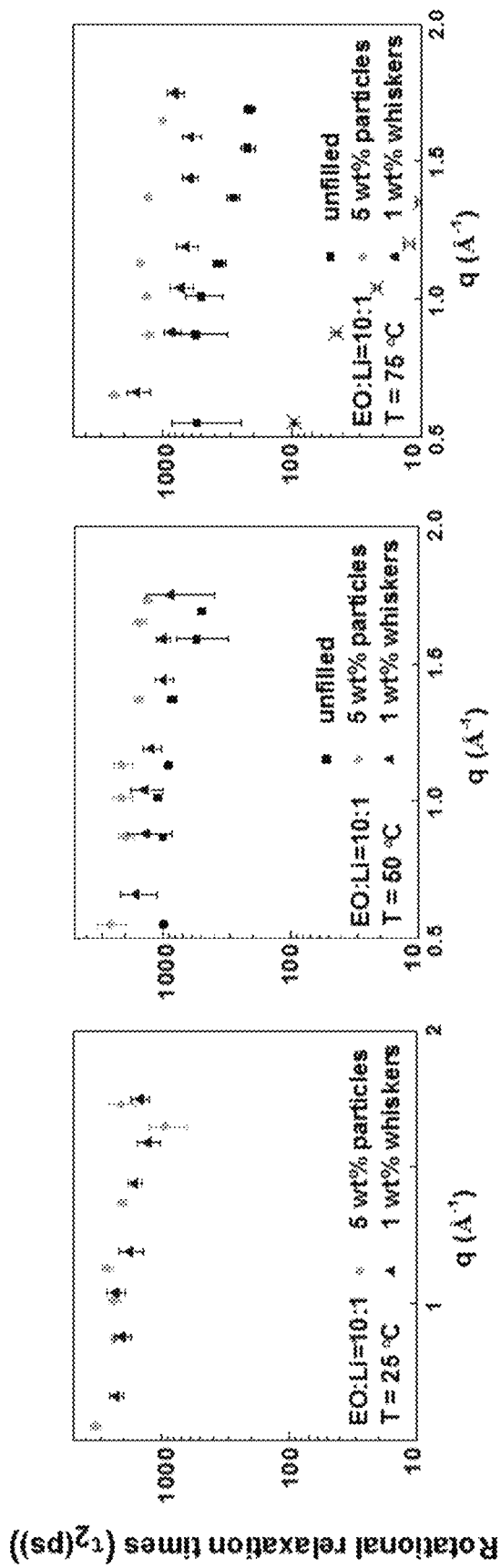
Figure 11C:
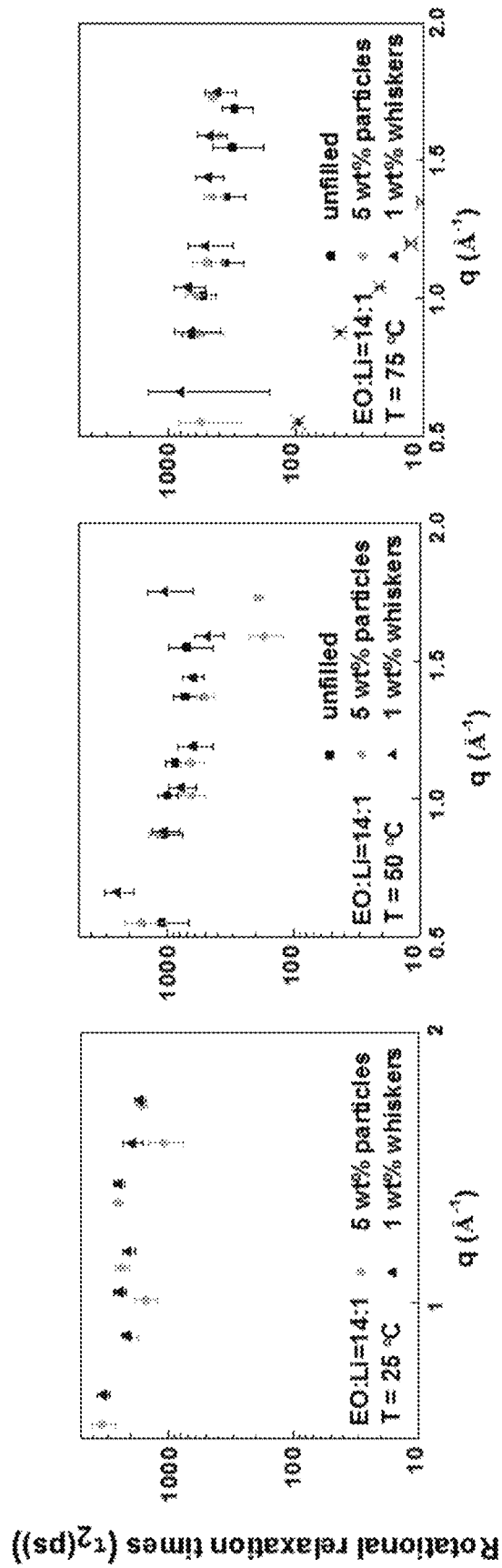

Rotation of $PEO_6:LiClO_4$ tunnels. $PEO_6:LiClO_4$ remnants are present in all the compositions investigated in this study. This tunnel-like structure undergoes a slow rotation that can be probed by HFBS instrument. Rotational process is characterized by spatial scale independent relaxation times. Local remnants of $PEO_6$ structure have been observed above the melting point and their rotation detected on timescales of a few nanoseconds. See Mao, G.; Saboungi, M-L.; Price, D. L.; Armand, Howells, W. S. Phys. Rev. Lett. 2000, 84, 5536-5539; Londono, J. D.; Anis, B. K.; Habenschuss, A.; Borodin, O.; Smith, G. D; Turner, J. Z.; Soper, A. K. Macromolecules 1997, 30, 7151-7157; Mao, G.; Saboungi, M.-L. Badyal, Y. S.; Fischer, H. E. Europhys. Lett. 2001, 54, 347-353; and Fullerton-Shirey, S. K.; Maranas, J. K. Macromolecules 2009, 42, 2142-2156. In the presence of spherical particles, the rotation of $PEO_6$ tunnels was found to persist above PEO melting temperature only at the eutectic composition. This indicates that the structure exists long enough at the particle surface to probe the restricted rotation. To evaluate the role played by nanowhiskers in stabilizing $PEO_6$ remnants, we examine rotational relaxation times ($\tau_2$) in the presence of nanowhiskers as a function of spatial scale (q), as shown in FIG. 11A-FIG. 11C.

At non-eutectic compositions, the rotational relaxation times are similar in the absence and presence of both filler types and slope down with spatial scale (q) as temperature increases. Although not wishing to be bound by theory, we believe that this indicates onset of segmental character probably because the tunnel-like $PEO_6$ structure falls apart at higher temperatures. For the eutectic compositions at 75° C., similar to the spherical particle-filled SPEs, nanowhiskers affect $PEO_6$ rotation only and the rotational relaxation times are in between those of the unfilled and particle-filled SPEs. Nanowhiskers are fewer in number compared to the particles at optimum loading, but rotational times may be more restricted in the presence of the longer nanowhiskers. This may imply that particles are stabilizing more tunnels; but there is a higher increase with nanowhiskers.

Figure 12A:
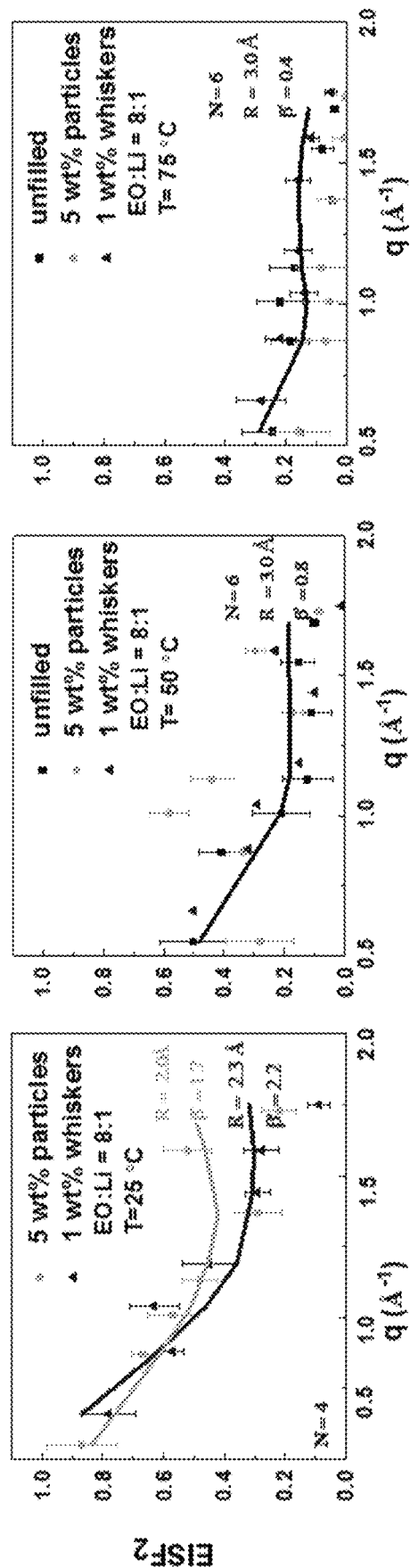
FIG. 12A-FIG. 12C shows $EISF_2$ as a function of q at different EO/Li and temperatures for unfilled, 5 wt % neutral particle filled and 1 wt % neutral nanowhisker-filled SPEs.
Figure 12B:
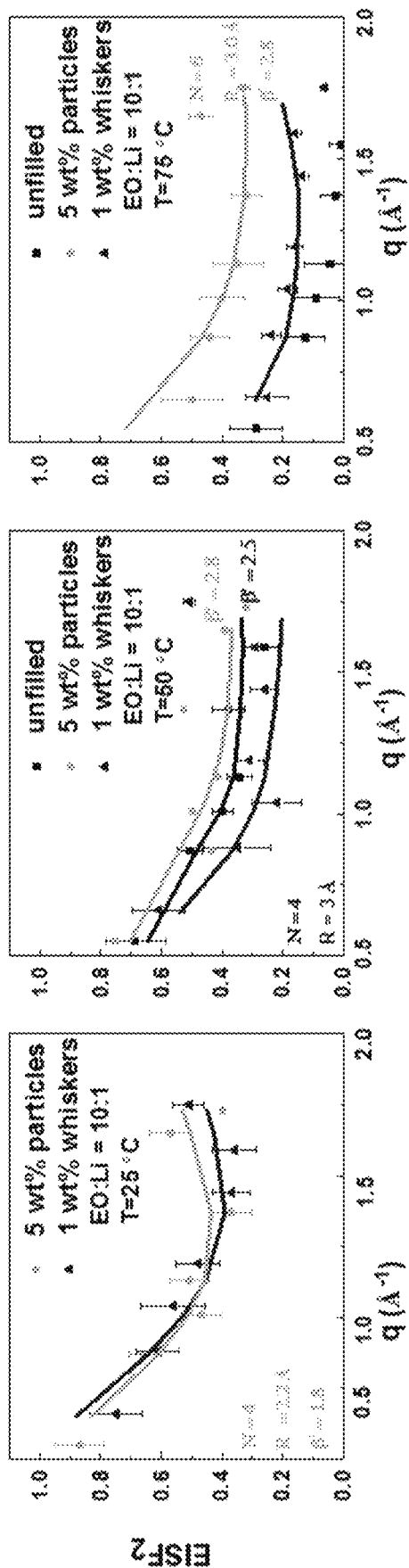
Figure 12C:
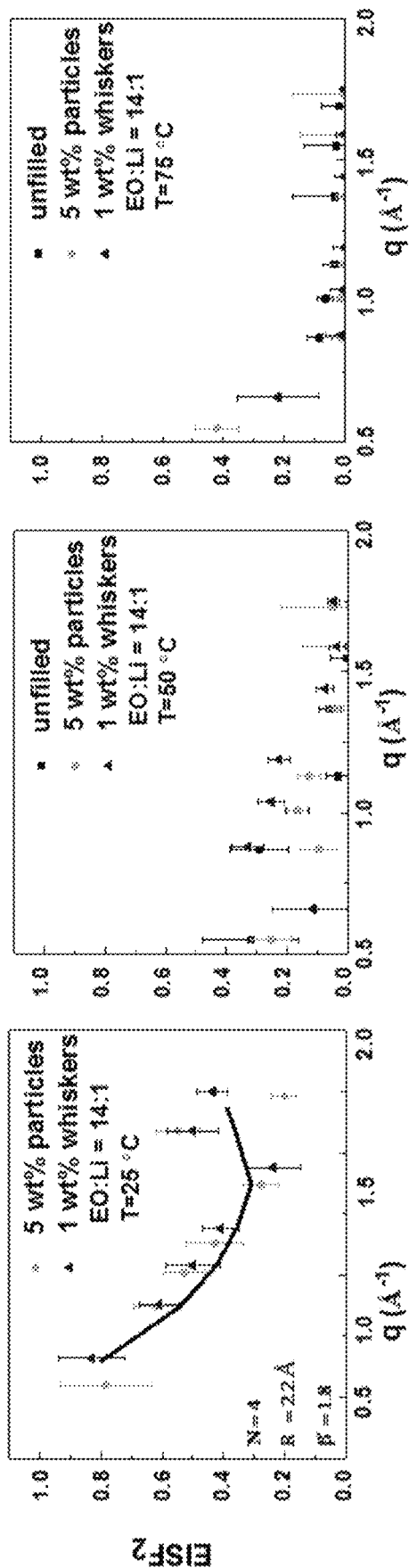

Geometry of $PEO_6$ rotation in the presence of nanowhiskers. The nature of $PEO_6:LiClO_4$ rotation in the presence of nanowhiskers is evaluated using q-dependence of $EISF_2$, the elastic incoherent structure factor, as shown in FIG. 12A-FIG. 12C. $EISF_2$ includes all motion slower than the window of HFBS instrument, and its q-dependence indicates the geometry of such a process. The $EISF_2$ vs q data are fit to a model that describes rotation of H atoms in a circle with non-uniform residence time distribution of the most favorable jump sites. This model is described using Equation 4, $$EISF(q) = \frac{1}{NI_o^2}\sum_{n=1}^{N}\left(j_o\left(2qR\sin\frac{\pi n}{N}\right)\right)\left(I_o\left(2\beta'\left|\cos\frac{\pi n}{N}\right|\right)\right) \quad \text{Equation 4}$$

A detailed description of the model is available in Bée, Marc. "Quasielastic neutron scattering," Quasielastic Neutron Scattering: Principles and Applications in Solid State Chemistry, Biology and Materials Science. Adam Hilger, Bristol, England, 1988. That document is incorporated by reference herein. The model includes three parameters: the radius R of the circle of rotation, the number of jump sites on the circle, N, and the parameter $\beta'$, which defines the extent to which rotation is restricted. A larger value of $\beta'$ indicates a more restricted rotation.

Figure 13:
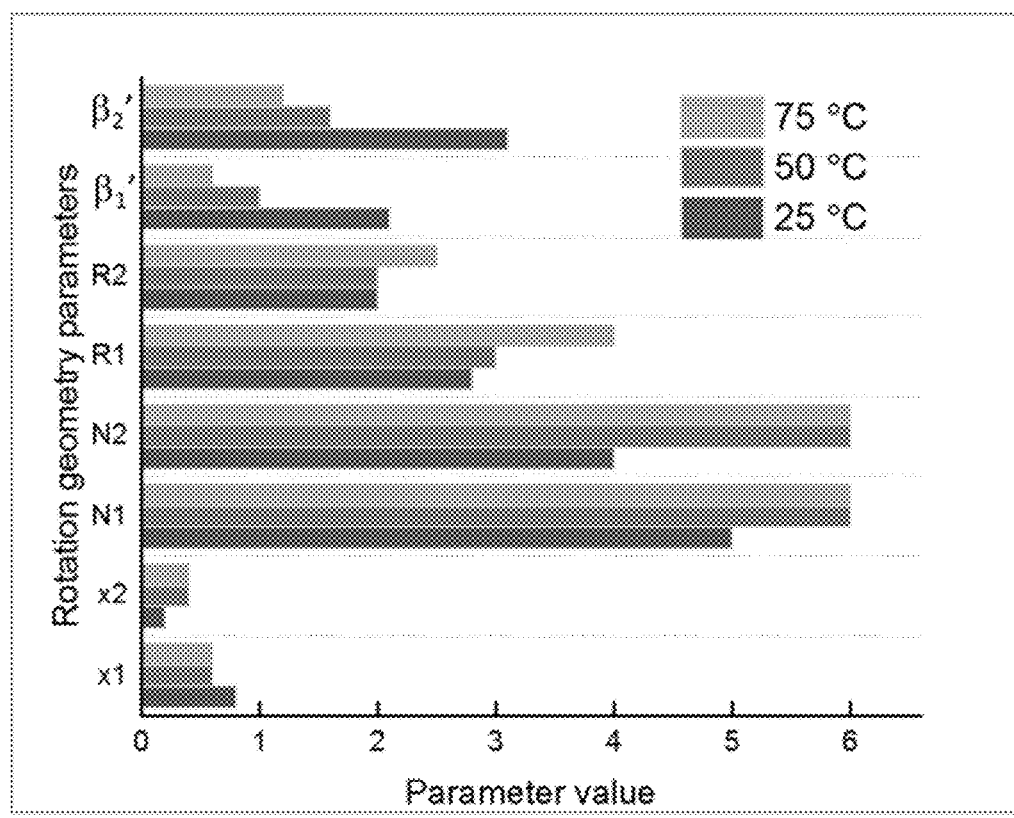
FIG. 13 is a bar chart showing the variation of the model parameters with temperature in a nanowhisker-filled eutectic sample.

FIG. 12A-FIG. 12C shows EISF2 as a function of q at different EO/Li and temperatures for unfilled, 5 wt % neutral particle filled and 1 wt % neutral nanowhisker-filled SPEs. Solid lines represent fits of data to a model that describes restricted rotation of H atoms in cylindrical $PEO_6$:$LiClO_4$ remnants over a circle of radius R Å with N preferred sites and extent of restriction $\beta'$. While the unfilled, nanoparticle-filled and non-eutectic nanowhisker-filled data fit to a single EISF model, the nanowhisker-filled eutectic sample data fits to a combination of two EISF models. Fit parameters for nanowhisker-filled eutectic sample are shown in FIG. 13.

At the non-eutectic compositions (EO/Li=8, 14), the rotation of $PEO_6$:$LiClO_4$ structures fits to a single non-uniform rotational model at all temperatures. In samples with salt composition EO/Li=8, the number of sites on the circle, N, becomes smaller for lower temperatures, which indicates a more restricted rotation at lower temperatures. At 25° C. for this composition, there is a difference in rotation geometry between particle and nanowhisker-filled samples only. The rotating structure has a bigger radius at this temperature in the presence of nanowhiskers. At a composition of EO/Li=14, rotation only is observed at 25° C. More segmental character is observed at higher temperatures in the spatial dependence of rotational relaxation times and consequently $EISF_2$ at higher temperatures does not fit to a rotation model. At the eutectic composition, the unfilled and particle-filled data fit to a single non-uniform rotational model whereas the nanowhisker-filled samples can be described with a combination of two models as shown in the Equation 5 below:

$$EISF2(q) = x_1 EISF2_{model1} + x_2 EISF2_{model2} \quad \text{Equation (5)}$$

where, $x_1$ and $x_2$ are the fraction of H atoms in $PEO_6$:$LiClO_4$ structure that undergo rotation according to parameters described in model 1 ($N_1$, $R_1$, $\beta_1'$) and model 2 ($N_2$, $R_2$, $\beta_2'$) respectively.

The bar chart in FIG. 13 shows a summary of the fit parameters for nanowhisker-filled eutectic sample as a function of temperature. A larger number of H atoms participate in the first process. The radius of PEO6 tunnels increases with increase in temperature. At all three temperatures, the model 1 in Equation 5 has a larger radius and is less restricted ($\beta_1' < \beta_2'$) than model 2. Without wishing to be bound by theory, one explanation to this could be that the second model corresponds to $PEO_6$ layers right next to the nanowhisker surface. The rotation of this layer is more restricted because of the interaction of $Li^+$ with basic sites (—Ö—) on the neutral nanowhisker surface. The first model parameters could be describing the subsequent layers beyond the first layer. Thus they are less restricted in rotation than the first layer.

This description is in agreement with the mechanism described in FIG. 4. Because the nanowhiskers have a longer interface with the SPE components, they can not only stabilize and orient the $PEO_6$ tunnels along their length but also support the growth of multiple layers beyond a first layer. This differentiates them from spherical particles, which can be described with a single rotation model and do not have significant number of layers that undergo a second type of rotation. Promotion of $PEO_6$-assisted conduction is consistent in the presence of both nanowhiskers and particles; local stabilization of $PEO_6$ by the filler surface without large-scale crystallization would depend on the presence, direction and length of continuous nanofiller surfaces. Consistent with this, nanowhiskers enhance conductivity more than the particles. Such a mechanism is decoupled from PEO segmental mobility, and is advantageous because it provides a means to overcome the barrier set forth by segmental mobility. SPE conductivity may be enhanced via high-aspect ratio fillers, without compromising on the SPE modulus.

We claim:

1. An electrolyte comprising a crystalline solid electrolyte including: a $PEO_6$lithium salt crystalline complex, and at least one nanofiller selected from the group consisting of natural cellulose nanowhiskers, acid treated cellulose nanowhiskers, and surface oxidized cellulose nanowhiskers.

2. The electrolyte of claim 1, wherein the nanofiller includes cellulose nanowhiskers selected from the group consisting of acetobacter nanowhiskers and cotton nanowhiskers.

3. The electrolyte of claim 1, wherein the cellulose nanowhiskers have an aspect ratio of at least about 10.

4. The electrolyte of claim 1, wherein the crystalline solid electrolyte comprises from about 0.5 to about 2.5 wt. % of cellulose nanowhiskers.

5. The electrolyte of claim 1, wherein the crystalline solid electrolyte comprises about 1 wt. % of cellulose nanowhiskers.

6. The electrolyte of claim 1, wherein the cellulose nanowhiskers have a crystalline structure.

7. The electrolyte of claim 1, wherein an average molecular weight of PEO is at least about 100K Da.

8. The electrolyte of claim 1, wherein an average molecular weight of PEO is about 600K Da.

9. The electrolyte of claim 1, wherein the cellulose nanowhiskers are pretreated with an acid selected from the group consisting of $H_2SO_4$ and $H_3PO_4$.

10. The electrolyte of claim 1, wherein the cellulose nanowhiskers have diameters of about 6 nm to about 15 nm.

11. The electrolyte of claim 1, wherein the cellulose nanowhiskers have lengths of about 150 nm to about 3 μm.

12. The electrolyte of claim 1, wherein the cellulose nanowhiskers have lengths of about 150 nm to about 200 nm.

13. The electrolyte of claim 1, wherein the cellulose nanowhiskers have lengths of about 1 μm to about 3 μm.

14. The electrolyte of claim 1, wherein the crystalline complex has a eutectic composition.

15. An electrolyte comprising a crystalline solid electrolyte including:
a crystalline complex comprising $PEO_6$ and a lithium salt, and
at least one nanofiller selected from the group consisting of natural cellulose nanowhiskers, acid treated cellulose nanowhiskers, and surface oxidized cellulose nanowhiskers, wherein the eutectic composition has a lamellar structure of alternating layers of $PEO_6$lithium salt and PEO.

16. An electrolyte comprising a crystalline solid electrolyte including:
a crystalline complex comprising $PEO_6$ and a lithium salt, and at least one nanofiller selected from the group consisting of natural cellulose nanowhiskers, acid treated cellulose nanowhiskers, and surface oxidized cellulose nanowhiskers, wherein the cellulose nanowhiskers are aligned under at least one of an electric field, a magnetic field, and a shear force to increase the conductivity of the electrolyte.

17. The electrolyte of claim 1, wherein the at least one nanofiller has a conductivity at 20° C. of at least 10-5 S/cm and an activation energy for Li conduction less than 10 kJ/mol.

18. An electrolyte comprising a crystalline solid electrolyte including:
a crystalline complex comprising $PEO_6$ and a lithium salt, and
at least one nanofiller selected from the group consisting of natural cellulose nanowhiskers, acid treated cellulose nanowhiskers, surface oxidized cellulose nanowhiskers, $Al_2O_3$ nanowhiskers, and other metal oxide nanowhiskers, and
the at least one nanofiller having an aspect ratio of at least about 10.

19. The electrolyte of claim 18, the at least one nanofiller having an aspect ratio from about 10 to about 200.

20. The electrolyte of claim 18, wherein the crystalline complex comprising $PEO_6$ and a lithium salt is selected from the group of salts that form $PEO_6LiX$ complex in phase diagram, wherein the $PEO_6LiX$ complex in phase diagram is selected from the group consisting of $PEO_6LiClO_4$, $PEO_6LiTFSI$ and $PEO_6LiAsF_6$.

21. The electrolyte of claim 18, wherein the crystalline solid electrolyte comprises from about 0.5 to about 2.5 wt. % of the at least one nanofiller.

22. The electrolyte of claim 18, wherein the crystalline solid electrolyte comprises about 1 wt. % of the at least one nanofiller.

23. The electrolyte of claim 18, wherein the nanofiller includes $Al_2O_3$ nanowhiskers with diameters of about 2 nm to about 4 nm and lengths of about 200 nm to about 400 nm.

* * * * *